United States Patent
Takata et al.

(10) Patent No.: US 11,614,205 B2
(45) Date of Patent: Mar. 28, 2023

(54) PIPING DIAGNOSTIC DEVICE, PIPING DIAGNOSTIC METHOD, DISCRIMINANT-PROBLEM OPTIMIZING DEVICE, DISCRIMINANT-PROBLEM OPTIMIZING METHOD, CRITERIA DISTRIBUTION GENERATING DEVICE, CRITERIA DISTRIBUTION GENERATING METHOD, AND STORAGE MEDIUM

(71) Applicant: NEC Corporation, Tokyo (JP)

(72) Inventors: Soichiro Takata, Tokyo (JP); Takahiro Kumura, Tokyo (JP); Kanta Miyake, Tokyo (JP); Shin Tominaga, Tokyo (JP); Hirofumi Inoue, Tokyo (JP); Shigeki Shinoda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1180 days.

(21) Appl. No.: 16/078,133

(22) PCT Filed: Feb. 16, 2017

(86) PCT No.: PCT/JP2017/005621
§ 371 (c)(1),
(2) Date: Aug. 21, 2018

(87) PCT Pub. No.: WO2017/145900
PCT Pub. Date: Aug. 31, 2017

(65) Prior Publication Data
US 2021/0190272 A1    Jun. 24, 2021

(30) Foreign Application Priority Data
Feb. 26, 2016   (JP) .............................. JP2016-035123

(51) Int. Cl.
*F17D 5/06* (2006.01)
*G01M 3/24* (2006.01)
*G01M 3/28* (2006.01)

(52) U.S. Cl.
CPC .............. *F17D 5/06* (2013.01); *G01M 3/243* (2013.01); *G01M 3/2815* (2013.01)

(58) Field of Classification Search
CPC .......... G01M 3/24; G01M 3/28; G01M 3/243; G01M 3/2815; F16L 1/00; G01N 29/07
See application file for complete search history.

(56) References Cited

U.S. PATENT DOCUMENTS

| 5,798,459 A | 8/1998 | Ohba et al. |
| 10,234,430 B2 * | 3/2019 | Takamine ................. G01L 1/16 |

(Continued)

FOREIGN PATENT DOCUMENTS

| JP | H03-92795 A | 4/1991 |
| JP | H05-256731 A | 10/1993 |

(Continued)

OTHER PUBLICATIONS

International Search Report for PCT Application No. PCT/JP2017/005621, dated May 9, 2017.

(Continued)

*Primary Examiner* — Michael P Nghiem
*Assistant Examiner* — Dacthang P Ngo
(74) *Attorney, Agent, or Firm* — Sughrue Mion, PLLC

(57) ABSTRACT

A piping diagnostic device according to an exemplary aspect of the present invention includes: criteria distribution generating means for generating a criteria distribution that is (Continued)

statistical data of criteria data of piping based on construction information about the piping, design information about the piping, and material information about the piping; changed-state distribution generating means for generating a changed-state distribution that is statistical data of changed-state data of the piping that have changed due to aging based on at least either vibration or dynamic pressure of the piping that have changed due to aging; measurement means for measuring at least either vibration or dynamic pressure of the piping; and determining means for determining deterioration of the piping based on the criteria distribution, the changed-state distribution, and at least either vibration or dynamic pressure of the piping.

13 Claims, 14 Drawing Sheets

(56) References Cited

U.S. PATENT DOCUMENTS

| | | |
|---|---|---|
| 2014/0379280 A1 | 12/2014 | Arai et al. |
| 2015/0114121 A1 | 4/2015 | Takahashi et al. |
| 2015/0300907 A1* | 10/2015 | Giunta .................... G01H 1/00 |
| | | 702/39 |
| 2017/0153023 A1 | 6/2017 | Fujiwara et al. |
| 2017/0205376 A1* | 7/2017 | Tominaga .............. G01N 29/07 |

FOREIGN PATENT DOCUMENTS

| | | |
|---|---|---|
| JP | H08-304124 A | 11/1996 |
| JP | 2000-221098 A | 8/2000 |
| JP | 2000-292302 A | 10/2000 |
| JP | 2003-114294 A | 4/2003 |
| JP | 2006-329383 A | 12/2006 |
| JP | 2010-025715 A | 2/2010 |
| JP | 2015-004558 A | 1/2015 |
| JP | 2015-165205 A | 9/2015 |
| JP | 2016-012373 A | 1/2016 |
| WO | 2013/183314 A1 | 12/2013 |

OTHER PUBLICATIONS

English translation of Written opinion for PCT Application No. PCT/JP2017/005621.
JP Office Action for JP Application No. 2021-121358, dated May 24, 2022 with English Translation.

* cited by examiner

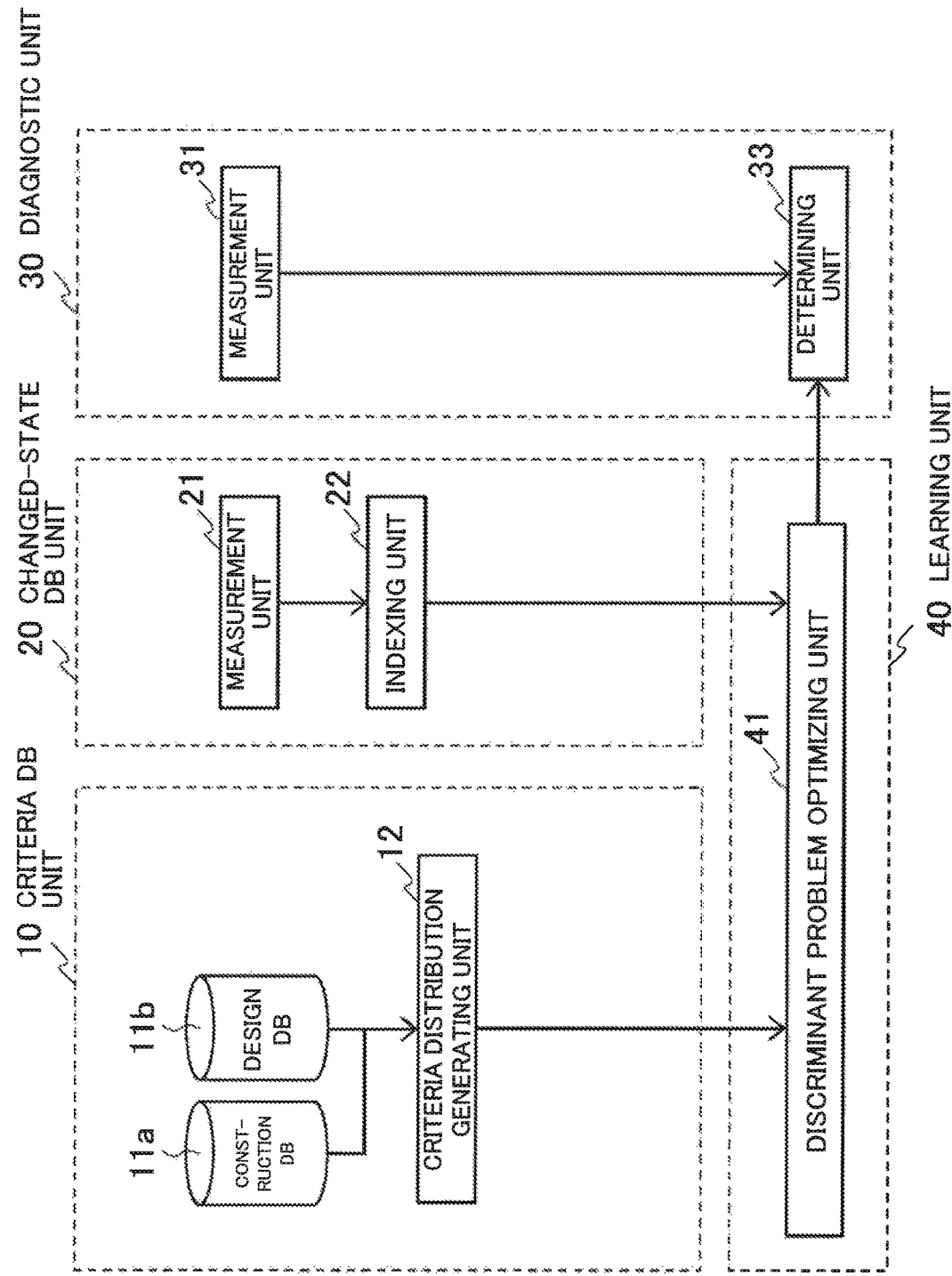

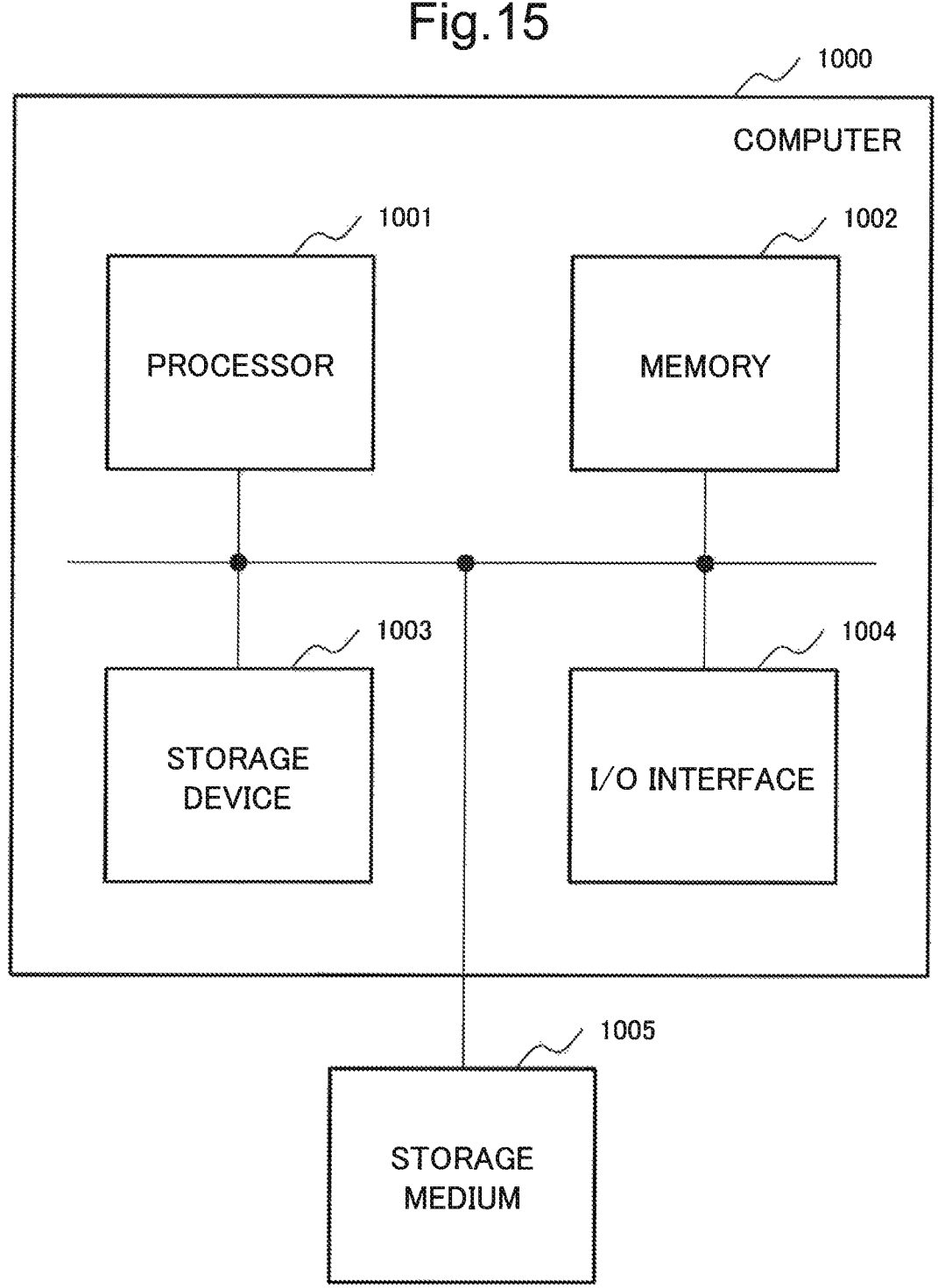

PIPING DIAGNOSTIC DEVICE, PIPING DIAGNOSTIC METHOD, DISCRIMINANT-PROBLEM OPTIMIZING DEVICE, DISCRIMINANT-PROBLEM OPTIMIZING METHOD, CRITERIA DISTRIBUTION GENERATING DEVICE, CRITERIA DISTRIBUTION GENERATING METHOD, AND STORAGE MEDIUM

This application is a National Stage Entry of PCT/JP2017/005621 filed on Feb. 16, 2017, which claims priority from Japanese Patent Application 2016-035123 filed on Feb. 26, 2016, the contents of all of which are incorporated herein by reference, in their entirety.

TECHNICAL FIELD

The present invention relates to a technology and the like for diagnosing piping.

BACKGROUND ART

A diagnostic method of a nuclear power generation plant has been proposed. Upon occurrence of an abnormality, the method is able to detect the abnormality immediately and to identify a cause thereof if the abnormality is of a known type, and if the abnormality is of an unknown type, learns it automatically and enables subsequent diagnostic (PTL 1). The diagnostic method is a method including preparing a neural network trained in advance so as to be able to determine whether a plant is normal or abnormal on the basis of power spectrum density patterns in normal conditions and power spectrum density patterns in abnormal conditions the causes of which are known, and learning automatically a power spectrum derived for determining a current state of the plant.

CITATION LIST

Patent Literature

[PTL 1] Japanese Unexamined Patent Application Publication No. Hei 3-92795 (No. 1991-92795)

SUMMARY OF INVENTION

Technical Problem

However, since the above-described diagnostic method presupposes that data in normal and abnormal conditions can be acquired in advance, the diagnostic method is not able to be applied to devices, equipment, and the like of which data in normal conditions are difficult to acquire in advance.

One of the objects of the present invention is to provide a device for diagnosing piping, and the like that are applicable to even piping of which data in normal conditions are difficult to acquire in advance.

Solution to Problem

In order to achieve the object described above, a piping diagnostic device according to an exemplary aspect of the present invention includes: criteria distribution generating means for generating a criteria distribution that is statistical data of criteria data of piping based on construction information about the piping, design information about the piping, and material information about the piping; changed-state distribution generating means for generating a changed-state distribution that is statistical data of changed-state data of the piping that have changed due to aging based on at least either vibration or dynamic pressure of the piping that have changed due to aging; measurement means for measuring at least either vibration or dynamic pressure of the piping; and determining means for determining deterioration of the piping based on the criteria distribution, the changed-state distribution, and at least either vibration or dynamic pressure of the piping.

A piping diagnostic method according to an exemplary aspect of the present invention includes: performing criteria distribution generation including generating a criteria distribution that is statistical data of criteria data of piping based on construction information about the piping, design information about the piping, and material information about the piping; generating a changed-state distribution that is statistical data of changed-state data of the piping that have changed due to aging based on at least either vibration or dynamic pressure of the piping that have changed due to aging; measuring at least either vibration or dynamic pressure of the piping; and performing deterioration determination including determining deterioration of the piping based on the criteria distribution, the changed-state distribution, and at least either vibration or dynamic pressure of the piping.

A computer-readable storage medium according to an exemplary aspect of the present invention stores a program making a computer execute: criteria distribution generating processing of generating a criteria distribution that is statistical data of criteria data based on construction information about piping, design information about the piping, and material information about the piping; changed-state distribution generating processing of generating a changed-state distribution that is statistical data of changed-state data based on at least either vibration or dynamic pressure of the piping that have changed due to aging; measurement processing of measuring at least either vibration or dynamic pressure of the piping; and determining processing of determining deterioration of the piping based on the criteria distribution, the changed-state distribution, and at least either vibration or dynamic pressure of the piping.

A discriminant-problem optimizing device according to an exemplary aspect of the present invention includes: criteria distribution generating means for generating a criteria distribution that is statistical data of criteria data of the piping based on construction information about piping, design information about the piping, and material information about the piping; changed-state distribution generating means for generating a changed-state distribution that is statistical data of changed-state data of the piping that have changed due to aging based on at least either vibration or dynamic pressure of the piping that have changed due to aging; and discriminant problem optimizing means for generating a discriminant criterion based on the criteria distribution and the changed-state distribution.

A discriminant-problem optimizing method according to an exemplary aspect of the present invention includes: performing criteria distribution generation of generating a criteria distribution that is statistical data of criteria data of the piping based on construction information about piping, design information about the piping, and material information about the piping; generating a changed-state distribution that is statistical data of changed-state data of the piping that have changed due to aging based on at least either vibration or dynamic pressure of the piping that have changed due to aging; and performing discriminant problem optimization of generating a discriminant criterion based on the criteria distribution and the changed-state distribution.

A computer-readable storage medium according to an exemplary aspect of the present invention stores a program making a computer execute: criteria distribution generating processing of generating a criteria distribution that is statistical data of criteria data of the piping based on construction information about piping, design information about the piping, and material information about the piping; changed-state distribution generating processing of generating a changed-state distribution that is statistical data of changed-state data of the piping that have changed due to aging based on at least either vibration or dynamic pressure of the piping that have changed due to aging; and discriminant problem optimizing processing of generating a discriminant criterion based on the criteria distribution and the changed-state distribution.

A criteria distribution generating device according to an exemplary aspect of the present invention includes: construction information acquiring means for acquiring construction information about piping; design information acquiring means for acquiring design information about the piping; material information acquiring means for acquiring material information about the piping; and criteria distribution generating means for generating a criteria distribution that is statistical data of criteria data of the piping, by use of at least one selected from a group including a finite element method and a theoretical expression based on elastic theory, based on the construction information, the design information, and the material information, the finite element method using a material constant, a dimensions constant, and a boundary condition as input.

A criteria distribution generating method according to an exemplary aspect of the present invention includes: acquiring construction information about piping; acquiring design information about the piping; acquiring material information about the piping; and performing criteria distribution generation of generating a criteria distribution that is statistical data of criteria data of the piping, by use of at least one selected from a group including a finite element method and a theoretical expression based on elastic theory, based on the construction information, the design information, and the material information, the finite element method using a material constant, a dimensions constant, and a boundary condition as input.

A computer-readable storage medium according to an exemplary aspect of the present invention stores a program making a computer execute: construction information acquiring processing of acquiring construction information about piping; design information acquiring processing of acquiring design information about the piping; material information acquiring processing of acquiring material information about the piping; and criteria distribution generating processing of generating a criteria distribution that is statistical data of criteria data of the piping, by use of at least one selected from a group including a finite element method and a theoretical expression based on elastic theory, based on the construction information, the design information, and the material information, the finite element method using a material constant, a dimensions constant, and a boundary condition as input.

A piping diagnostic device according to an exemplary aspect of the present invention includes: criteria distribution generating means for generating a criteria distribution that is statistical data of criteria data of piping based on construction information about the piping and design information about the piping; changed-state distribution generating means for generating a changed-state distribution that is statistical data of changed-state data of the piping that have changed due to aging based on at least either vibration or dynamic pressure of the piping that have changed due to aging; measurement means for measuring at least either vibration or dynamic pressure of the piping; and determining means for determining deterioration of the piping based on the criteria distribution, the changed-state distribution, and at least either vibration or dynamic pressure of the piping.

A piping diagnostic method according to an exemplary aspect of the present invention includes: performing criteria distribution generation of generating a criteria distribution that is statistical data of criteria data of piping based on construction information about the piping and design information about the piping; performing changed-state distribution generation of generating a changed-state distribution that is statistical data of changed-state data of the piping that have changed due to aging based on at least either vibration or dynamic pressure of the piping that have changed due to aging; measuring at least either vibration or dynamic pressure of the piping; and performing deterioration determination of determining deterioration of the piping based on the criteria distribution, the changed-state distribution, and at least either vibration or dynamic pressure of the piping.

A computer-readable storage medium according to an exemplary aspect of the present invention stores a program making a computer execute: criteria distribution generating processing of generating a criteria distribution that is statistical data of criteria data of piping based on construction information about the piping and design information about the piping; changed-state distribution generating processing of generating a changed-state distribution that is statistical data of changed-state data of the piping that have changed due to aging based on at least either vibration or dynamic pressure of the piping that have changed due to aging; measurement processing of measuring at least either vibration or dynamic pressure of the piping; and determining processing of determining deterioration of the piping based on the criteria distribution, the changed-state distribution, and at least either vibration or dynamic pressure of the piping.

The present invention is also achieved by programs stored in the above-described storage media.

Advantageous Effects of Invention

The present invention is capable of providing a piping diagnostic device and a piping diagnostic method that are applicable to even piping of which data in normal conditions are difficult to acquire in advance.

BRIEF DESCRIPTION OF DRAWINGS

FIG. 14 is a schematic block diagram illustrating an example of a configuration of a piping diagnostic device of a seventh example embodiment.

FIG. 15 is a block diagram schematically illustrating a configuration of a computer that enables devices according to the respective example embodiments of the present invention to be achieved.

DESCRIPTION OF EMBODIMENTS

Figure 1:
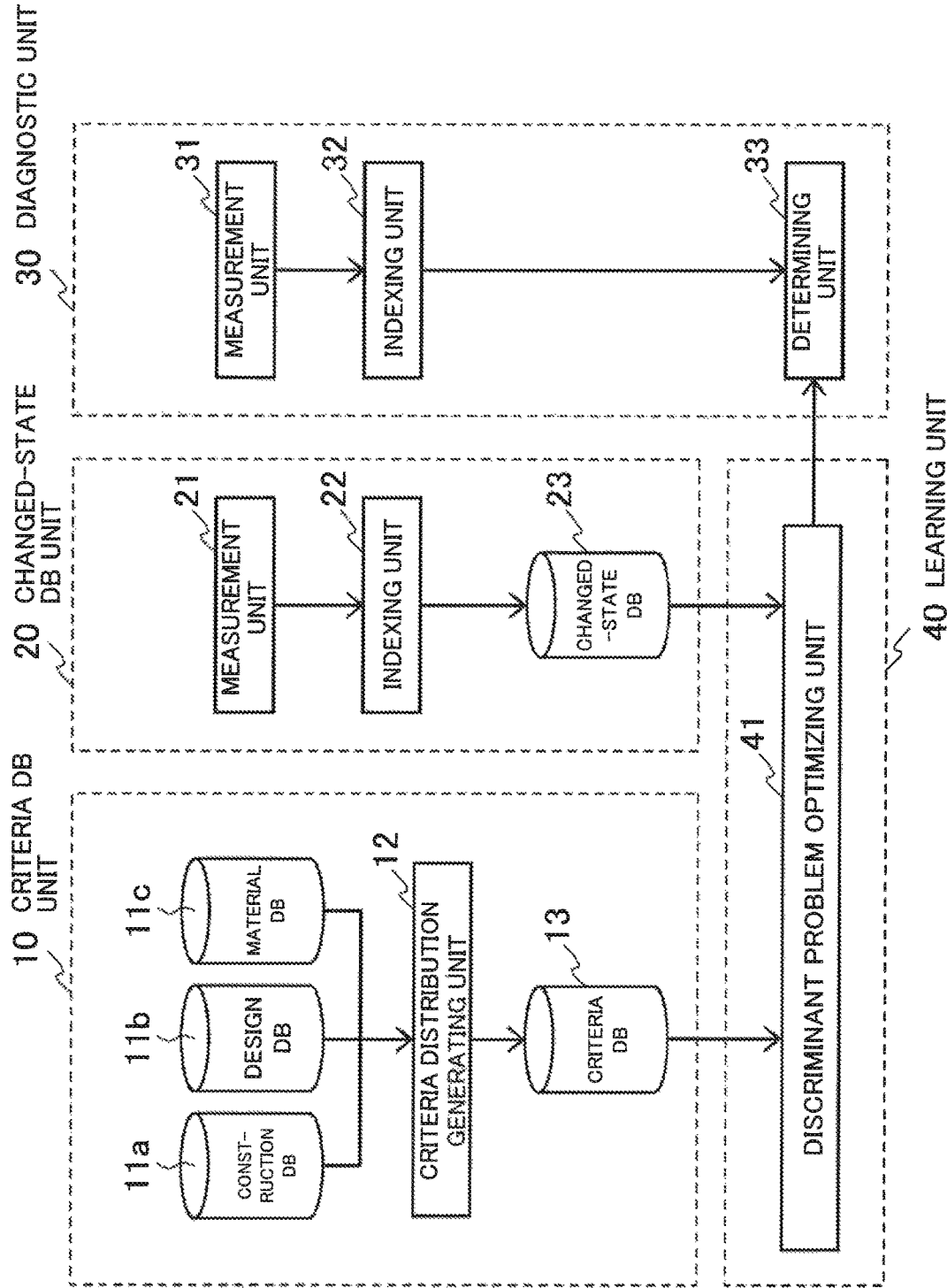
FIG. 1 is a schematic block diagram illustrating an example of a configuration of a piping diagnostic device of a first example embodiment.

In the present invention, the phrase "deterioration of piping" refers to a state in which piping inside which a fluid, such as water, oil, and gas, flows has got a hole and the fluid is leaking therethrough. In the present invention, the phrase "deterioration of piping" may refer to not only a state in which piping has got a hole but also a state in which the piping has corroded and become fragile, a state in which a connection between two adjacent pipes has become loose, and the like. In diagnostic of piping, such as water pipes, that has already been buried in the ground, the diagnostic is sometimes required to be performed in a state in which parameters of the piping at the time of burying the piping is not able to be grasped.

Hereinafter, a piping diagnostic device, a piping diagnostic method, a program, a storage medium, a discriminant-problem optimizing device, a discriminant-problem optimizing method, a criteria distribution generating device, and a criteria distribution generating process of the present invention is described in detail with criteria to the drawings, taking as an example a case where piping is water pipes. However, the present invention is not limited to the following description. The present invention may be used for, in addition to water pipes, a wide range of piping inside which a fluid, such as oil and gas, flows. In the following FIGS. 1 to 14, identical criteria numbers are assigned to identical components and a description thereof may be omitted. In addition, in the drawings, structures of components may be illustrated in an appropriately simplified manner for the purpose of illustration and dimensional ratios and the like of the components may be illustrated schematically differing from actual values.

First Example Embodiment

A schematic block diagram in FIG. 1 illustrates an example of a configuration of a piping diagnostic device of the present example embodiment. As illustrated in the drawing, a piping diagnostic device 1 of the present example embodiment includes a criteria database (DB) unit 10, a changed-state database (DB) unit 20, a diagnostic unit 30, and a learning unit 40. In the piping diagnostic device 1 of the present example embodiment, the learning unit 40 is an optional component member and, although being preferably included, does not have to be included.

The criteria DB unit 10 includes a construction database (DB) 11a, a design database (DB) 11b, a material database (DB) 11c, a criteria distribution generating unit 12, and a criteria database (DB) 13. In the criteria DB unit 10, the construction DB 11a, the design DB 11b, the material DB 11c, and the criteria DB 13 are optional component members and, although being preferably included, do not have to be included. In the construction DB 11a, at least construction information about water pipes is stored. In the design DB 11b, at least design information about the water pipes is stored. In the material DB 11c, at least material information about the water pipes is stored. For example, servers may operate as the construction DB 11a, the design DB 11b, and the material DB 11c. The construction DB 11a, the design DB 11b, and the material DB 11c each may be achieved by separate servers. All the databases may be included in one server. For example, information and the like about construction specifications, construction management, inspection, repair, and a management register may be used as the construction information about the water pipes. For example, information and the like about design specifications, design drawings, designed values, and design calculation may be used as the design information about the water pipes. For example, material test data and the like may be used as the material information about the water pipes. The criteria distribution generating unit 12 generates a criteria distribution that is statistical data of criteria data of the water pipes, based on the construction information, the design information, and the material information. The generation of a criteria distribution in the criteria distribution generating unit 12 may be performed by use of, for example, a finite element method which uses a material constant, a dimensions constant, and a boundary condition as input, and a theoretical expression based on elastic theory. In the criteria DB 13, criteria distributions are stored. A server or the like may operate as the criteria DB 13.

The changed-state DB unit 20 includes a measurement unit 21, an indexing unit 22, and a changed-state database (DB) 23. In the present example, the measurement unit 21 and the indexing unit 22 correspond to a changed-state distribution generating unit in the claims. In the changed-state DB unit 20, the changed-state DB 23 is an optional component member and, although being preferably included, does not have to be included. The measurement unit 21 measures at least either vibration or dynamic pressure of water pipes. For example, an acceleration sensor such as an acceleration pickup, a displacement sensor such as a laser displacement meter, a velocity sensor such as a laser Doppler velocimeter, a water pressure meter, a dynamic pressure sensor such as a hydrophone, and the like may be used for implementing the measurement unit 21. The indexing unit 22 calculates a discriminant index of water pipes, on the basis of at least either vibration or dynamic pressure, measured by the measurement unit 21, of the water pipes. The indexing unit 22 further generates a changed-state distribution that is integrated data of changed-state data of the water pipes, on the basis of the calculated discriminant index. For example, sound velocity of vibration, natural frequencies of water pipes, and the like may be used as the discriminant index. In the changed-state DB 23, changed-state distributions are stored. For example, a server and the like may be used as changed-state DB 23. The measurement unit 21 may measure, for example, at least either vibration or dynamic pressure of water pipes that is given as water pipes having changed due to aging. Vibration and dynamic pressure that are obtained as a result of the measurement in that case is also referred to as vibration and dynamic pressure of water pipes that have changed due to aging. A changed-state distribution generated by the indexing unit 22 on the basis of at least either the vibration or the dynamic pressure measured in this case is, in the following description, also referred to as a changed-state distribution that is integrated data of changed-state data of water pipes having changed due to aging. Changes such as the above-described "deterioration of piping" become likely to occur on water pipes depending on time that has elapsed since the start of the use of the water pipes. Water pipes having changed due to aging are, for example, water pipes in which a change is regarded as having occurred in conditions due to time that has elapsed since the start of use. Such a change in conditions of water pipes that are used as water pipes having changed due to aging does not have to be confirmed. That is, for example, water pipes that has been used for a predetermined time from the start of use may be used as water pipes having changed due to aging. The predetermined time may be determined based on at least any of the quality of water flowing through the water pipes, the type of the water pipes, a place where the water pipes have been used, and the like. For example, water pipes in which occurrence of the above-described "deterioration of piping" is confirmed through visual examination and the like by an operator may be used as water pipes having changed due to aging.

The learning unit 40 includes a discriminant problem optimizing unit 41. The discriminant problem optimizing unit 41 generates a discriminant criterion on the basis of a criteria distribution and a changed-state distribution. For example, a support vector machine, a linear classifier, a kernel classifier, a k-NN classifier, a deep neural network, and the like may be used for implementing the discriminant problem optimizing unit 41. The discriminant criterion may be, for example, a discriminant function generated by a support vector machine, a discriminant function generated by a linear classifier, a discriminant function generated by a kernel classifier, a discriminant function generated by a k-nearest neighbor (k-NN) classifier, a discriminant function generated by a deep neural network, or the like.

The diagnostic unit 30 includes a measurement unit 31, an indexing unit 32, and a determining unit 33. In the diagnostic unit 30, the indexing unit 32 is an optional component member and, although being preferably included, does not have to be included. The measurement unit 31 measures at least either vibration or dynamic pressure of water pipes at the time of diagnostic. For example, an acceleration sensor such as an acceleration pickup, a displacement sensor such as a laser displacement meter, a velocity sensor such as a laser Doppler velocimeter, a water pressure meter, a dynamic pressure sensor such as a hydrophone, and the like may be used for implementing the measurement unit 31. The indexing unit 32 calculates a discriminant index of water pipes at the time of diagnostic on the basis of at least either vibration or dynamic pressure of the water pipes at the time of diagnostic. The discriminant index may be, for example, sound velocity of vibration, natural frequencies of water pipes, or the like at the time of diagnostic. The determining unit 33 determines deterioration of piping on the basis of a discriminant criterion and a discriminant index. When the piping diagnostic device 1 of the present example does not include the discriminant problem optimizing unit 41, the determining unit 33 is able to use a criteria distribution and a changed-state distribution in place of a discriminant criterion. In addition, when the piping diagnostic device 1 of the present example does not include the indexing unit 32, the determining unit 33 is able to use at least either vibration or dynamic pressure of water pipes at the time of diagnostic in place of a discriminant index.

Figure 2:
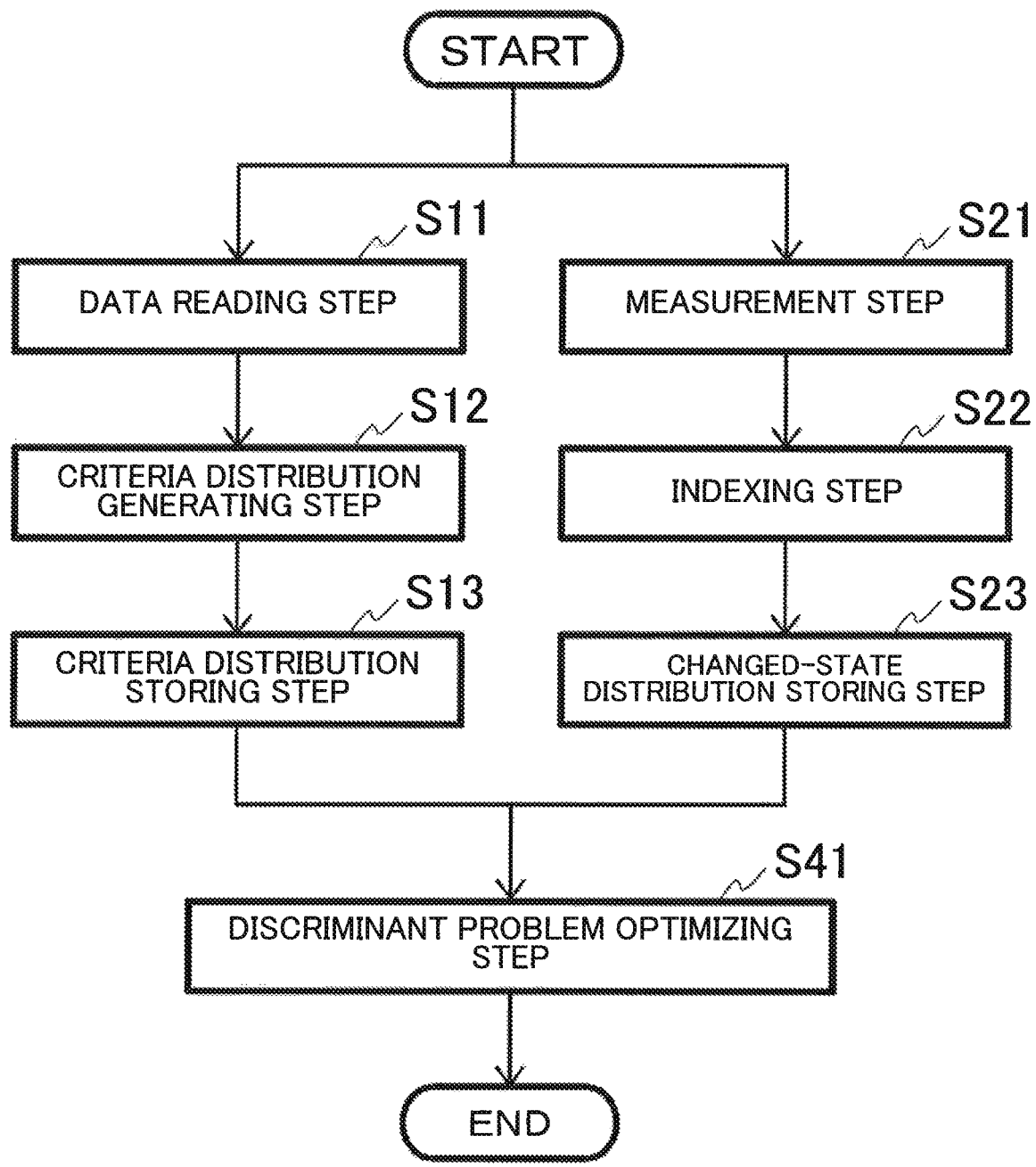
FIG. 2 is a flowchart illustrating an example of a learning process in a piping diagnostic method of the first example embodiment.
Figure 3:
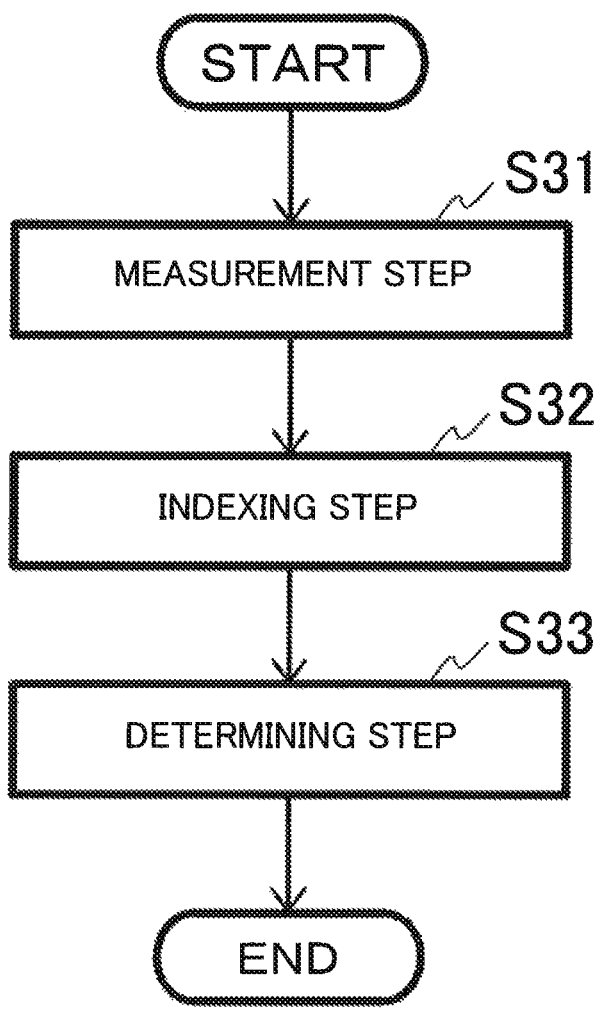
FIG. 3 is a flowchart illustrating an example of a diagnostic process in the piping diagnostic method of the first example embodiment.

Next, using FIG. 2 and FIG. 3, a piping diagnostic method of the present example embodiment is described. The piping diagnostic method of the present example embodiment may be performed by use of, for example, the piping diagnostic device 1 of the present example embodiment illustrated in FIG. 1.

FIG. 2 is a flowchart illustrating an example of a learning process in the piping diagnostic method of the present example embodiment. As illustrated in the drawing, the learning process is divided into a criteria DB generating process of steps S11 to S13 and a changed-state DB generating process of steps S21 to S23. In the criteria DB generating process, the criteria distribution generating unit 12 first reads data of construction information, design information, and material information from the construction DB 11*a*, the design DB 11*b*, and the material DB 11*c*, respectively (S11). Next, the criteria distribution generating unit 12 converts the data of construction information, design information, and material information into numerical values, models, and the like of material constants, sizes, and boundary conditions in forms applicable to a finite element method, elastic theory, or the like, and provides the numerical values, the models, and the like with degrees of variation. Further, the criteria distribution generating unit 12 calculates, on the basis of the data, statistical data of sound velocity of vibration, a natural frequency, and the like of water pipes, which are discriminant indexes, by use of frequency response calculation through a finite element method, theoretical expression based on elastic theory, or the like, by means of a Monte Carlo method or the like (S12). Next, the criteria distribution generating unit 12 stores the calculated statistical data in the criteria DB 13 as a criteria distribution (S13).

In the changed-state DB generating process, the measurement unit 21 measures vibration and dynamic pressure of water pipes that have changed due to aging (S21). Next, the indexing unit 22 calculates, on the basis of the measured vibration and dynamic pressure, statistical data of sound velocity of vibration, a natural frequency, or the like of the water pipes by means of a Monte Carlo method or the like (S22). Next, the indexing unit 22 stores the calculated statistical data in the changed-state DB 23 as a changed-state distribution (S23). Next, the discriminant problem optimizing unit 41 generates a discriminant criterion, such as a discriminant function, on the basis of the criteria distribution and the changed-state distribution (S41).

FIG. 3 is a flowchart illustrating an example of a diagnostic process in the piping diagnostic method of the present example embodiment. The measurement unit 31 first measures at least either vibration or dynamic pressure of water pipes at the time of diagnostic (S31). Next, the indexing unit 32 calculates, as discriminant indexes, statistical data of sound velocity of vibration, a natural frequency, and/or the like of the water pipes at the time of diagnostic by means of a Monte Carlo method or the like (S32). Next, the determining unit 33 determines deterioration of the water pipes, on the basis of the discriminant criterion and a discriminant index (S33).

As described above, the present example embodiment is capable of providing a piping diagnostic device and a piping diagnostic method that are applicable to even piping, such as existing water pipes, of which data in normal conditions are difficult to acquire in advance.

Second Example Embodiment

Figure 4:
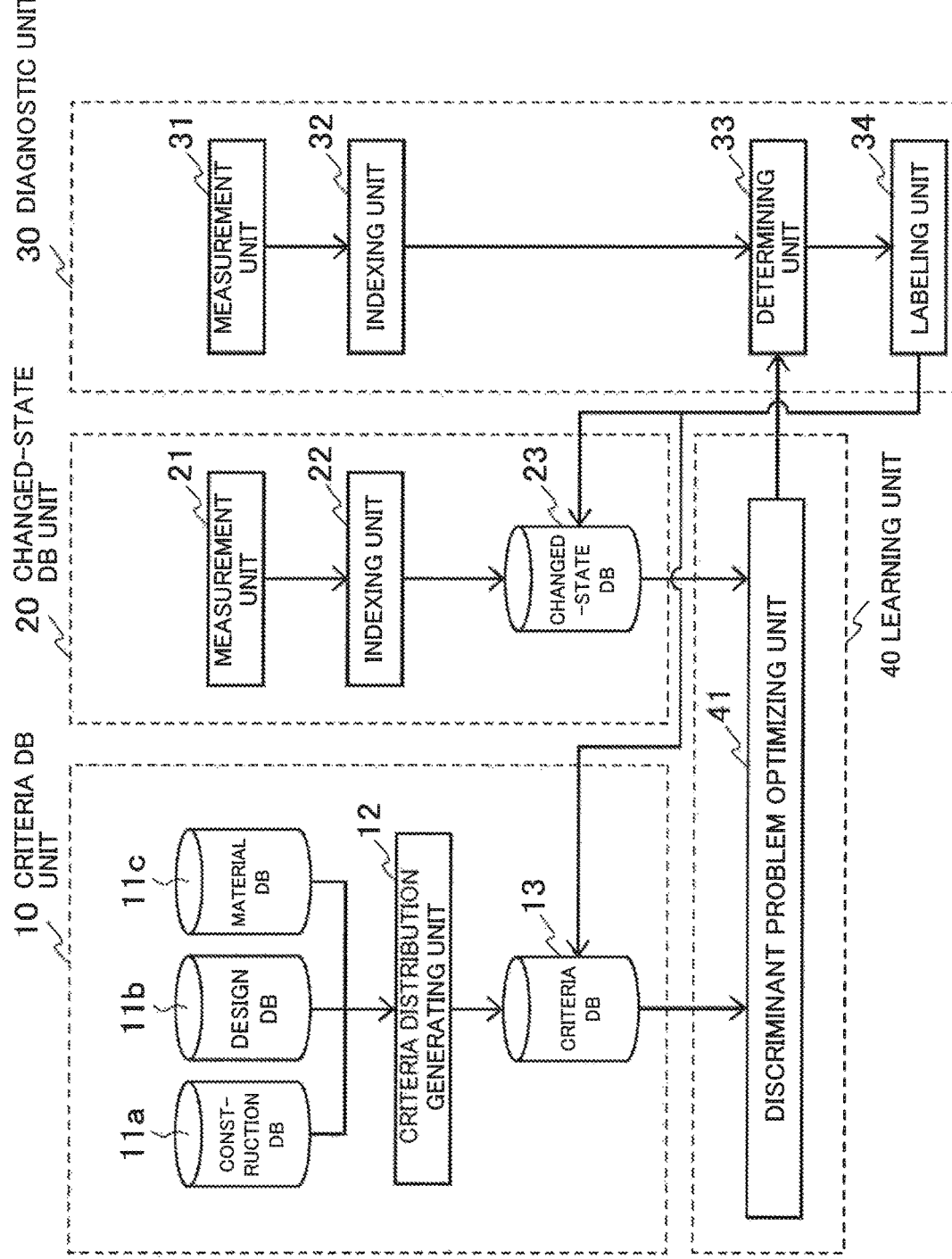
FIG. 4 is a schematic block diagram illustrating an example of a configuration of a piping diagnostic device of a second example embodiment.

In a schematic block diagram in FIG. 4, an example of a configuration of a piping diagnostic device of the present example embodiment is illustrated. As illustrated in the drawing, a piping diagnostic device 1 of the present example embodiment is the same as the piping diagnostic device 1 of the first example embodiment illustrated in FIG. 1 except that a diagnostic unit 30 further includes a labeling unit 34.

Next, a piping diagnostic method of the present example embodiment is described. The piping diagnostic method of the present example embodiment may be performed by use of, for example, the piping diagnostic device 1 of the present example embodiment illustrated in FIG. 4. Since a learning process in the piping diagnostic method of the present example embodiment is similar to that described using FIG. 2 in the first example embodiment, only a diagnostic process in the piping diagnostic method of the present example embodiment is described using FIG. 5 in the following description.

Figure 5:
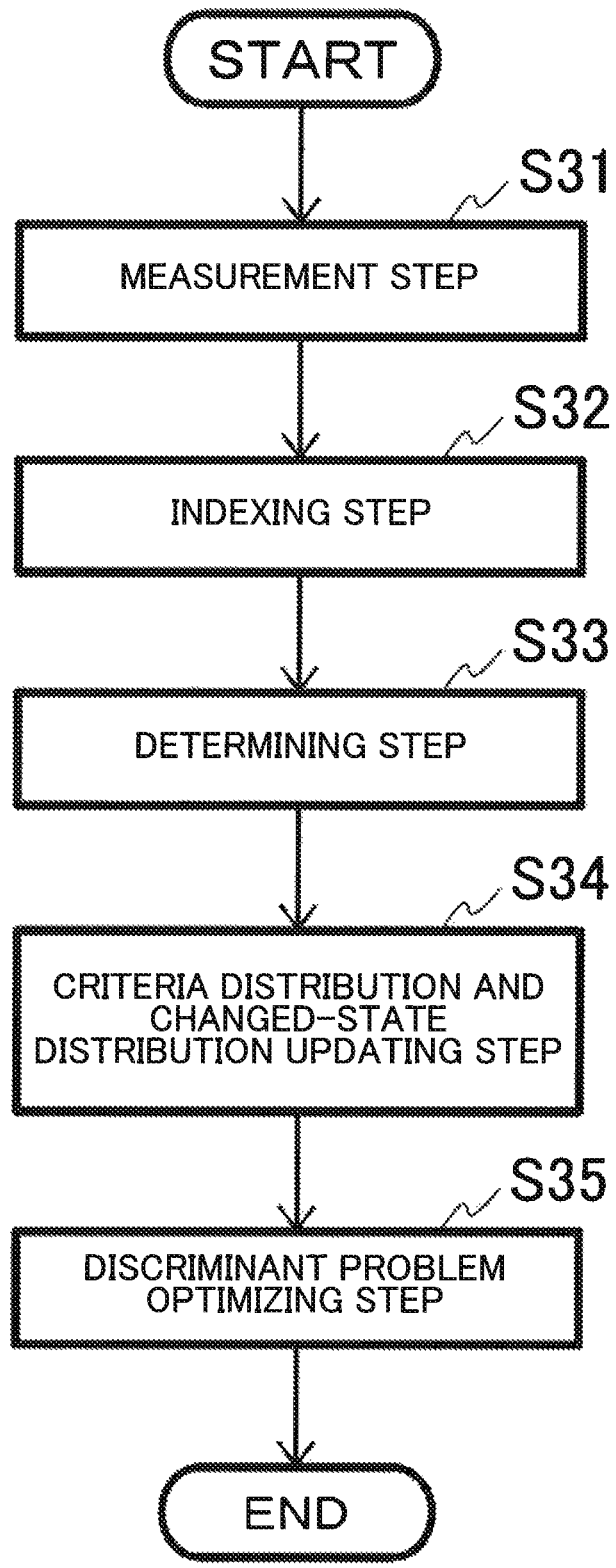
FIG. 5 is a flowchart illustrating an example of a diagnostic process in a piping diagnostic method of the second example embodiment.

FIG. 5 is a flowchart illustrating an example of the diagnostic process in the piping diagnostic method of the present example embodiment. In the diagnostic process, S31 to S33 are similar to those described using FIG. 3 in the first example embodiment. Next, the labeling unit 34 updates a criteria distribution and a changed-state distribution that are stored in a criteria DB 13 and a changed-state DB 23, respectively, on the basis of a result of determination on deterioration of water pipes at the time of diagnostic (S34). Next, a discriminant problem optimizing unit 41 updates a discriminant criterion, such as a discriminant function, by generating another discriminant criterion, on the basis of the updated criteria distribution and changed-state distribution (S35).

The present example embodiment is capable of automatically improving determination accuracy of deterioration of water pipes by means of update and has the advantageous effect obtainable in the first example embodiment in addition.

Third Example Embodiment

Figure 6:
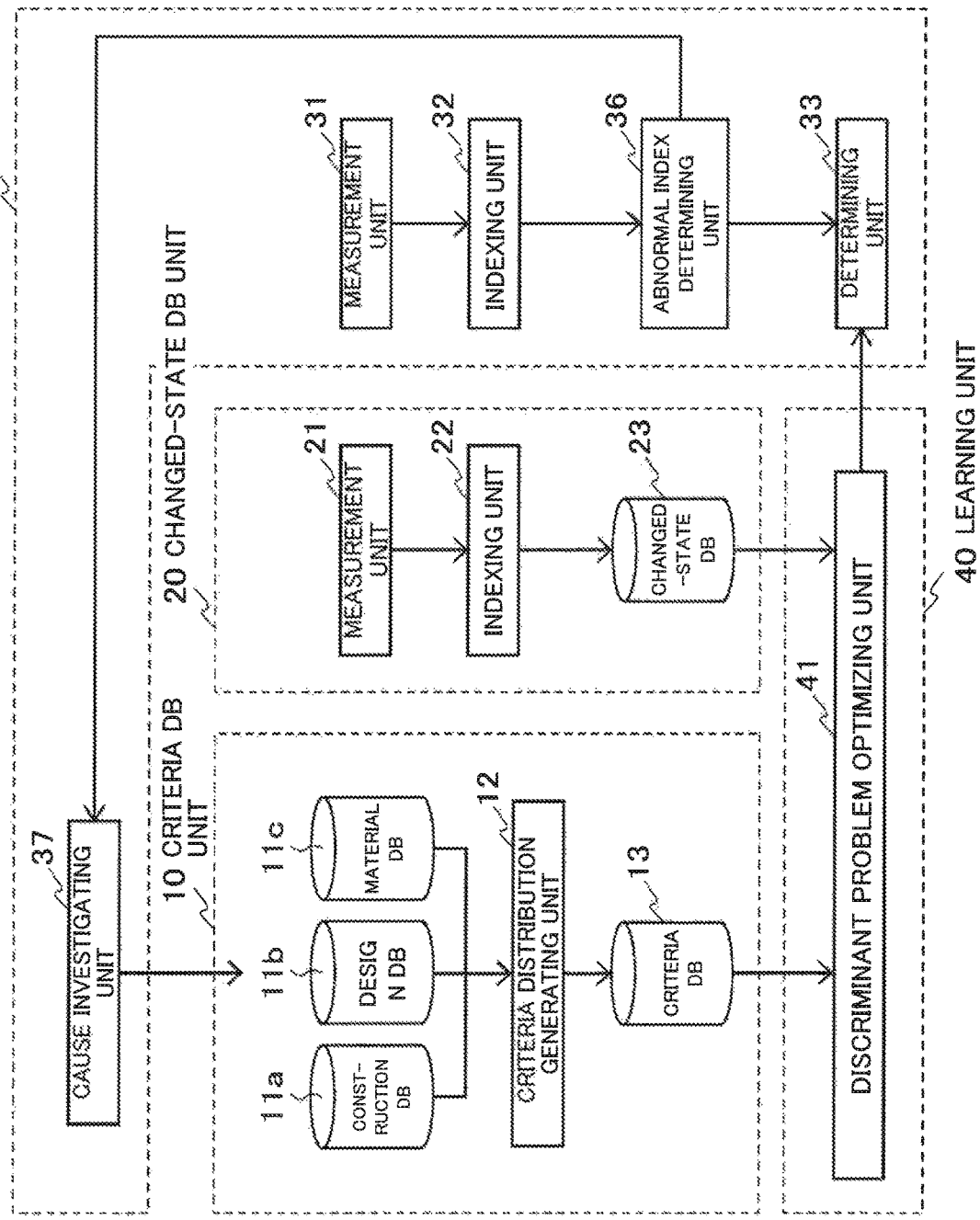
FIG. 6 is a schematic block diagram illustrating an example of a configuration of a piping diagnostic device of a third example embodiment.

In a schematic block diagram in FIG. 6, an example of a configuration of a piping diagnostic device of the present example embodiment is illustrated. As illustrated in the drawing, a piping diagnostic device 1 of the present example embodiment is the same as the piping diagnostic device 1 of the first example embodiment illustrated in FIG. 1 except that a diagnostic unit 30 further includes an abnormal index determining unit 36 and a cause investigating unit 37.

A method used by the cause investigating unit 37 may be, for example, visual examination, sampling inspection, destructive inspection, or non-destructive inspection.

Next, a piping diagnostic method of the present example embodiment is described. The piping diagnostic method of the present example embodiment may be performed by use of, for example, the piping diagnostic device 1 of the present example embodiment illustrated in FIG. 6. Since a learning process in the piping diagnostic method of the present example embodiment is similar to that described using FIG. 2 in the first example embodiment, only a diagnostic process in the piping diagnostic method of the present example embodiment is described using FIG. 7 in the following description.

Figure 7:
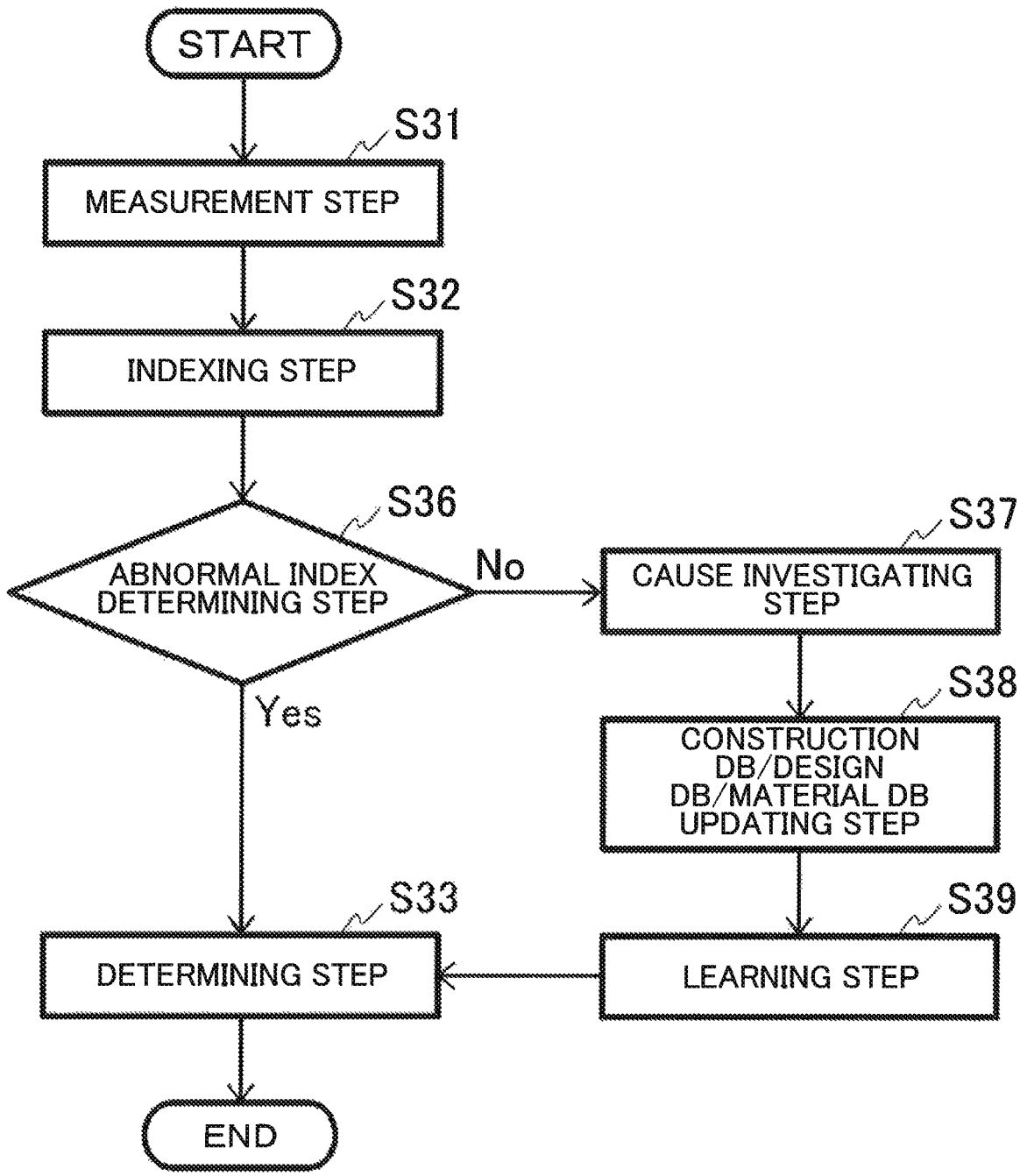
FIG. 7 is a flowchart illustrating an example of a diagnostic process in a piping diagnostic method of the third example embodiment.

FIG. 7 is a flowchart illustrating an example of the diagnostic process in the piping diagnostic method of the present example embodiment. In the diagnostic process, S31 and S32 are similar to those described using FIG. 3 in the first example embodiment. Next, the abnormal index determining unit 36 determines whether or not a discriminant index is abnormal on the basis of the discriminant index and a predetermined threshold value (S36). When the discriminant index is determined to be abnormal (No), the cause investigating unit 37 identifies a cause of the abnormality (S37) and rewrites and updates at least one of construction information, design information, and material information that are stored in a construction DB 11*a*, a design DB 11*b*, and a material DB 11*c*, respectively (S38). Next, by use of the updated information, the learning process, described using FIG. 2 in the first example embodiment, is performed, and a discriminant criterion is updated (S39). Next, the determining unit 33 determines deterioration of water pipes, on the basis of the updated discriminant criterion and the discriminant index (S33). On the other hand, when the discriminant index is determined to be normal (Yes), the determining unit 33 determines deterioration of water pipes, on the basis of the discriminant criterion and the discriminant index (S33).

The present example embodiment, which has the advantageous effect obtainable in the first example embodiment in addition, detects an abnormal value of a discriminant index, investigates a cause of the abnormal value, and thereby detects a construction fault, a design change, and the like, and rewrites at least one of construction information, design information, and material information, thereby being capable of compensating determination accuracy of deterioration of water pipes.

Fourth Example Embodiment

A program of the present example embodiment is a program that is capable of performing the afore-described piping diagnostic methods by means of a computer. The program of the present example embodiment may be driven and processed by, for example, any of: a processor, such as a central processing unit (CPU), a network processor (NP), and a microprocessor; a microcontroller; and a circuit, such as a large scale integration (LSI). The program of the present example embodiment may be, for example, stored in a storage medium. Such a storage media is not specifically limited and may be, for example, a random access memory (RAM), a read only memory (ROM), a hard disk (HD), an optical disc, a floppy (Registered Trademark) disk (FD), or the like.

Fifth Example Embodiment

Figure 12:
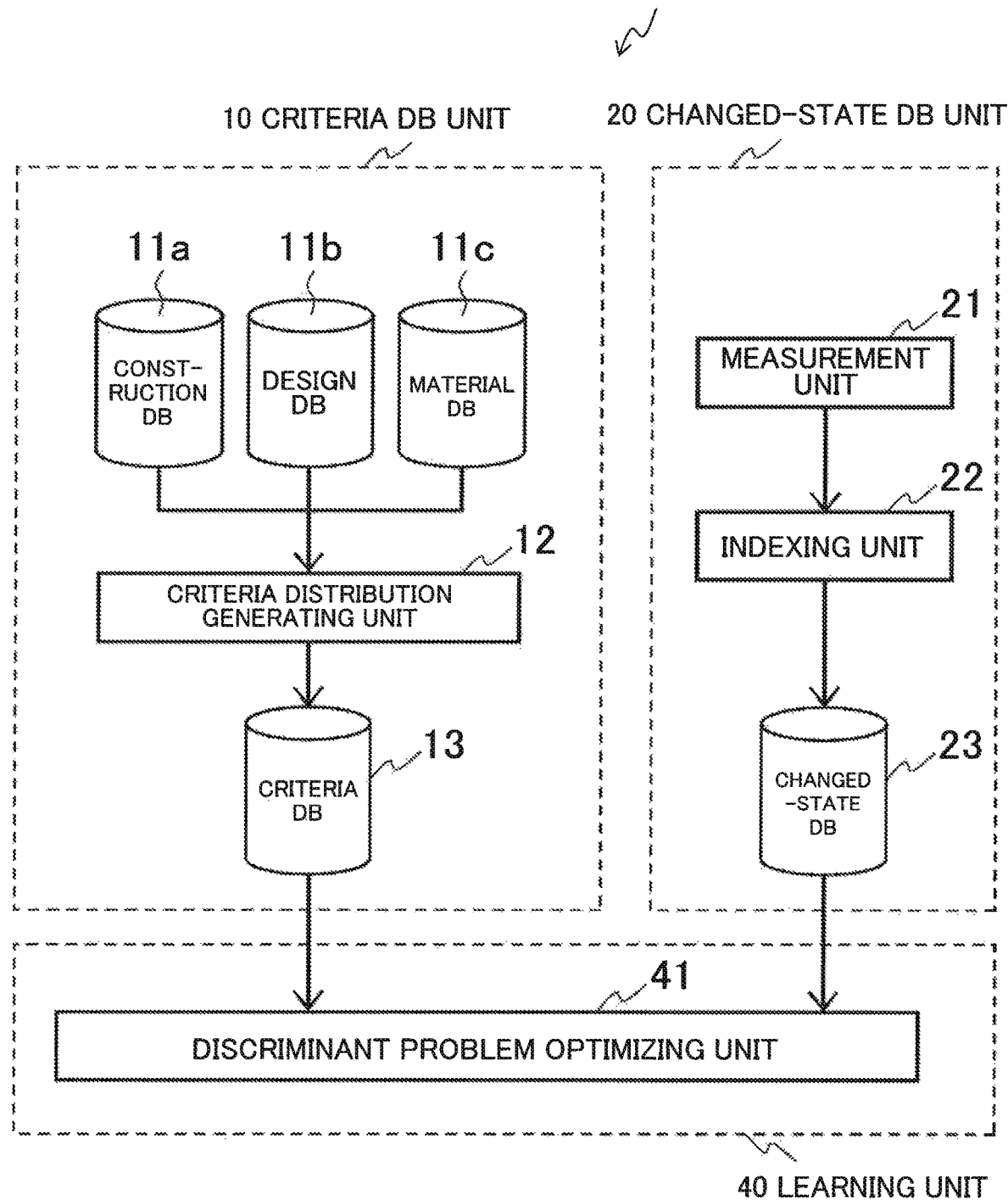
FIG. 12 is a schematic block diagram illustrating an example of a configuration of a discriminant-problem optimizing device of a fifth example embodiment.

In a schematic block diagram in FIG. 12, an example of a configuration of a discriminant-problem optimizing device of the present example embodiment is illustrated. As illustrated in the drawing, a discriminant-problem optimizing device 2 of the present example embodiment includes a criteria database (DB) unit 10, a changed-state database (DB) unit 20, and a learning unit 40.

The criteria DB unit 10 includes a construction database (DB) 11a, a design database (DB) 11b, a material database (DB) 11c, a criteria distribution generating unit 12, and a criteria database (DB) 13. In the criteria DB unit 10, the construction DB 11a, the design DB 11b, the material DB 11c, and the criteria DB 13 are optional component members and, although being preferably included, do not have to be included. In the construction DB 11a, at least construction information about water pipes is stored. In the design DB 11b, at least design information about the water pipes is stored. In the material DB 11c, at least material information about the water pipes is stored. For example, servers may operate as the construction DB 11a, the design DB 11b, and the material DB 11c. The construction DB 11a, the design DB 11b, and the material DB 11c each may be achieved by separate servers. All the databases may be included in one server. The construction information about the water pipes may be information about, for example, construction specifications, construction management, inspection, repair, and a management register. The design information about the water pipes may be information about, for example, design specifications, design drawings, designed values, and design calculation. For example, material test data may be used as the material information about the water pipes. The criteria distribution generating unit 12 generates a criteria distribution that is statistical data of criteria data of the water pipes, on the basis of the construction information, the design information, and the material information. The generation of a criteria distribution in the criteria distribution generating unit 12 may be performed by use of, for example, a finite element method which uses a material constant, a dimensions constant, and a boundary condition as input, a theoretical expression based on elastic theory, or the like. In the criteria DB 13, criteria distributions are stored. A server may operate as the criteria DB 13.

The changed-state DB unit 20 includes a measurement unit 21, an indexing unit 22, and a changed-state database (DB) 23. In the present example, the measurement unit 21 and the indexing unit 22 correspond to a changed-state distribution generating means in Supplementary Note 29, which is described later. In the changed-state DB unit 20, the changed-state DB 23 is an optional component member and, although being preferably included, does not have to be included. The measurement unit 21 measures at least either vibration or dynamic pressure of water pipes that have changed due to aging. For example, an acceleration sensor such as an acceleration pickup, a displacement sensor such as a laser displacement meter, a velocity sensor such as a laser Doppler velocimeter, a water pressure meter, a dynamic pressure sensor such as a hydrophone, and the like may be used for implementing the measurement unit 21. The indexing unit 22 calculates a discriminant index of the water pipes that have changed due to aging on the basis of at least either vibration or dynamic pressure of the water pipes that have changed due to aging, and further generates a changed-state distribution that is integrated data of changed-state data of the water pipes that have changed due to aging on the basis of the calculated discriminant index. The discriminant index may be, for example, sound velocity of vibration, natural frequencies of water pipes, or the like. In the changed-state DB 23, changed-state distributions are stored. A server may operate as the changed-state DB 23.

The learning unit 40 includes a discriminant problem optimizing unit 41. The discriminant problem optimizing unit 41 generates a discriminant criterion, on the basis of a criteria distribution and a changed-state distribution. For example, a support vector machine, a linear classifier, a kernel classifier, a k-NN classifier, a deep neural network, or the like may be used for implement the discriminant problem optimizing unit 41. The discriminant criterion may be, for example, a discriminant function generated by a support vector machine, a discriminant function generated by a linear classifier, a discriminant function generated by a kernel classifier, a discriminant function generated by a k-NN classifier, a discriminant function generated by a deep neural network, or the like.

The present example embodiment is capable of providing also a discriminant-problem optimizing method that includes: a criteria distribution generating process of generating a criteria distribution that is statistical data of criteria data of piping based on construction information about the piping, design information about the piping, and material information about the piping; a changed-state distribution generating process of generating a changed-state distribution that is statistical data of changed-state data of the piping that has changed due to aging based on at least either vibration or dynamic pressure of the piping that has changed due to aging; and a discriminant problem optimizing process of generating a discriminant criterion based on the criteria distribution and the changed-state distribution. The descriptions of the piping diagnostic devices and the piping diagnostic methods in the afore-described example embodiments of the present invention can be cited as those regarding the units in the discriminant-problem optimizing device of the present example embodiment and the steps in the discriminant-problem optimizing method of the present example embodiment.

Sixth Example Embodiment

Figure 13:
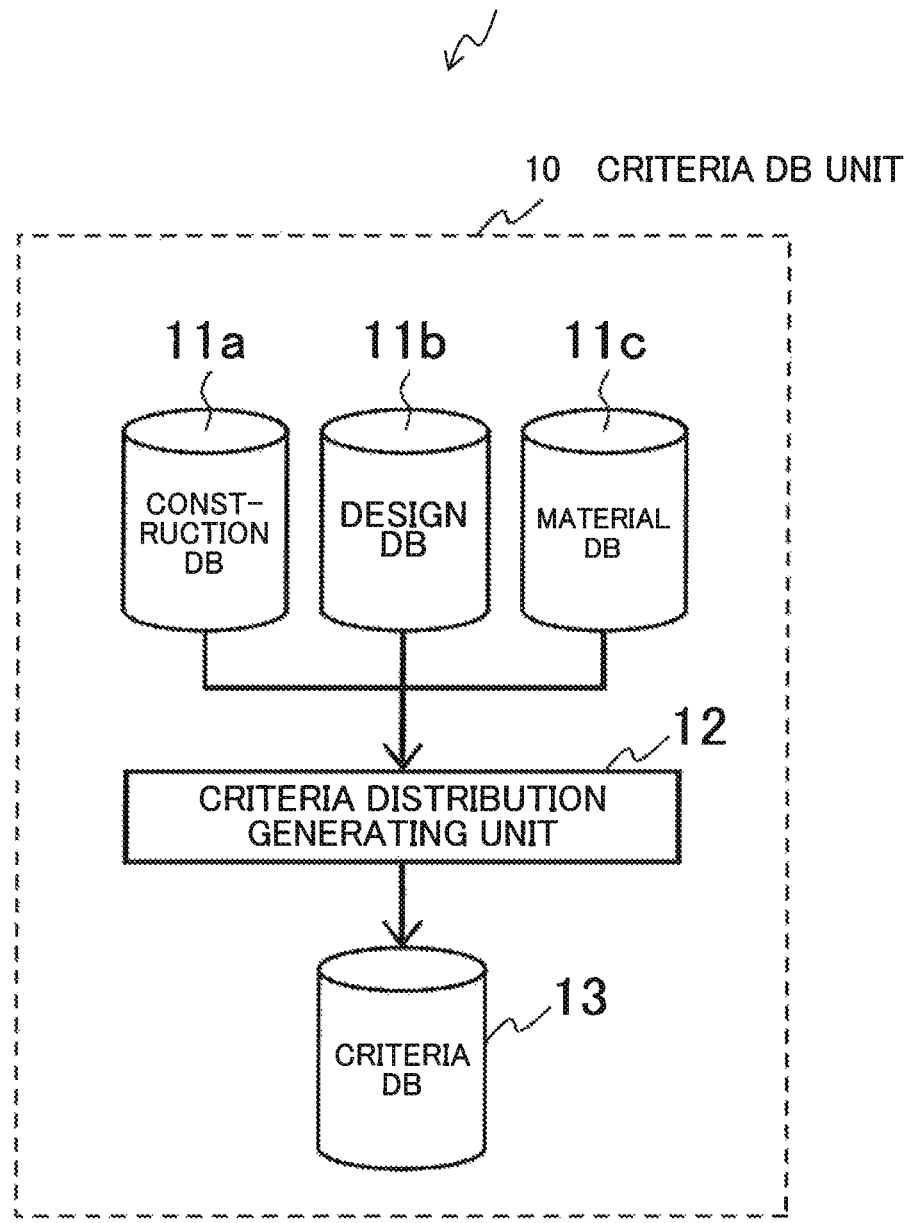
FIG. 13 is a schematic block diagram illustrating an example of a configuration of a criteria distribution generating device of a sixth example embodiment.

In a schematic block diagram in FIG. 13, an example of a configuration of a criteria distribution generating device of the present example embodiment is illustrated. As illustrated in the drawing, a criteria distribution generating device 3 of the present example embodiment includes a criteria database (DB) unit 10.

The criteria DB unit 10 includes a construction database (DB) 11a, a design database (DB) 11b, a material database (DB) 11c, a criteria distribution generating unit 12, and a criteria database (DB) 13. In the criteria DB unit 10, the construction DB 11a, the design DB 11b, the material DB 11c, and the criteria DB 13 are optional component members and, although being preferably included, do not have to be included. In the construction DB 11a, at least construction information about water pipes is stored. In the design DB 11b, at least design information about the water pipes is stored. In the material DB 11c, at least material information about the water pipes is stored. For example, servers and the like may operate as the construction DB 11a, the design DB 11b, and the material DB 11c. The construction DB 11a, the design DB 11b, and the material DB 11c each may be achieved by separate servers. All the databases may be included in one server. For example, information or the like about construction specifications, construction management, inspection, repair, and a management register may be uses as the construction information about the water pipes. For example, information and the like about design specifications, design drawings, designed values, and design calculation may be used as the design information about the water pipes. For example, material test data and the like may be used as the material information about the water pipes. The criteria distribution generating unit 12 generates a criteria distribution that is statistical data of criteria data of the water pipes, on the basis of the construction information, the design information, and the material information. The generation of a criteria distribution in the criteria distribution generating unit 12 may be performed by use of, for example, a finite element method which uses a material constant, a dimensions constant, and a boundary condition as input, a theoretical expression based on elastic theory, or the like. In the criteria DB 13, criteria distributions are stored. For example, a server may operate as the criteria DB 13.

The present example embodiment is capable of providing also a criteria distribution generating method that includes: a piping information acquiring step of acquiring construction information about piping; a design information acquiring step of acquiring design information about the piping; a material information acquiring step of acquiring material information about the piping; and generating a criteria distribution that is statistical data of criteria data of the piping, based on the construction information, the design information, and the material information, by use of at least one selected from a group including a finite element method which uses a material constant, a dimensions constant, and a boundary condition as input, and a theoretical expression based on elastic theory. The descriptions of the piping diagnostic devices and the piping diagnostic methods in the afore-described example embodiments of the present invention can be cited as those regarding the respective units in the criteria distribution generating device of the present example embodiment and the respective steps in the criteria distribution generating method of the present example embodiment.

Seventh Example Embodiment

In a schematic block diagram in FIG. 14, an example of a configuration of a piping diagnostic device of the present example embodiment is illustrated. As illustrated in the drawing, a piping diagnostic device 1 of the present example embodiment includes a criteria database (DB) unit 10, a changed-state database (DB) unit 20, a diagnostic unit 30, and a learning unit 40. In the piping diagnostic device 1 of the present example embodiment, the learning unit 40 is an optional component member and, although being preferably included, does not have to be included.

The criteria DB unit 10 includes a construction database (DB) 11a, a design database (DB) 11b, and a criteria distribution generating unit 12. In the criteria DB unit 10, at least construction information about water pipes is stored in the construction DB 11a. In the design DB 11b, at least design information about the water pipes is stored. For example, servers may be used as the construction DB 11a and the design DB 11b. The construction DB 11a and the design DB 11b each may be achieved by separate servers. All the databases may be included in one server.

The changed-state DB unit 20 includes a measurement unit 21 and an indexing unit 22. In the present example, the measurement unit 21 and the indexing unit 22 correspond to a changed-state distribution generating means in Supplementary Note 35, which is described later.

The learning unit 40 includes a discriminant problem optimizing unit 41.

The diagnostic unit 30 includes a measurement unit 31 and a determining unit 33.

The descriptions of the piping diagnostic device 1 in the afore-described first example embodiment can be cited as those regarding the respective units in the piping diagnostic device 1 of the present example embodiment.

The first to seventh example embodiments may be combined without departing from the technological concept of the present invention.

EXAMPLE

Figure 8:
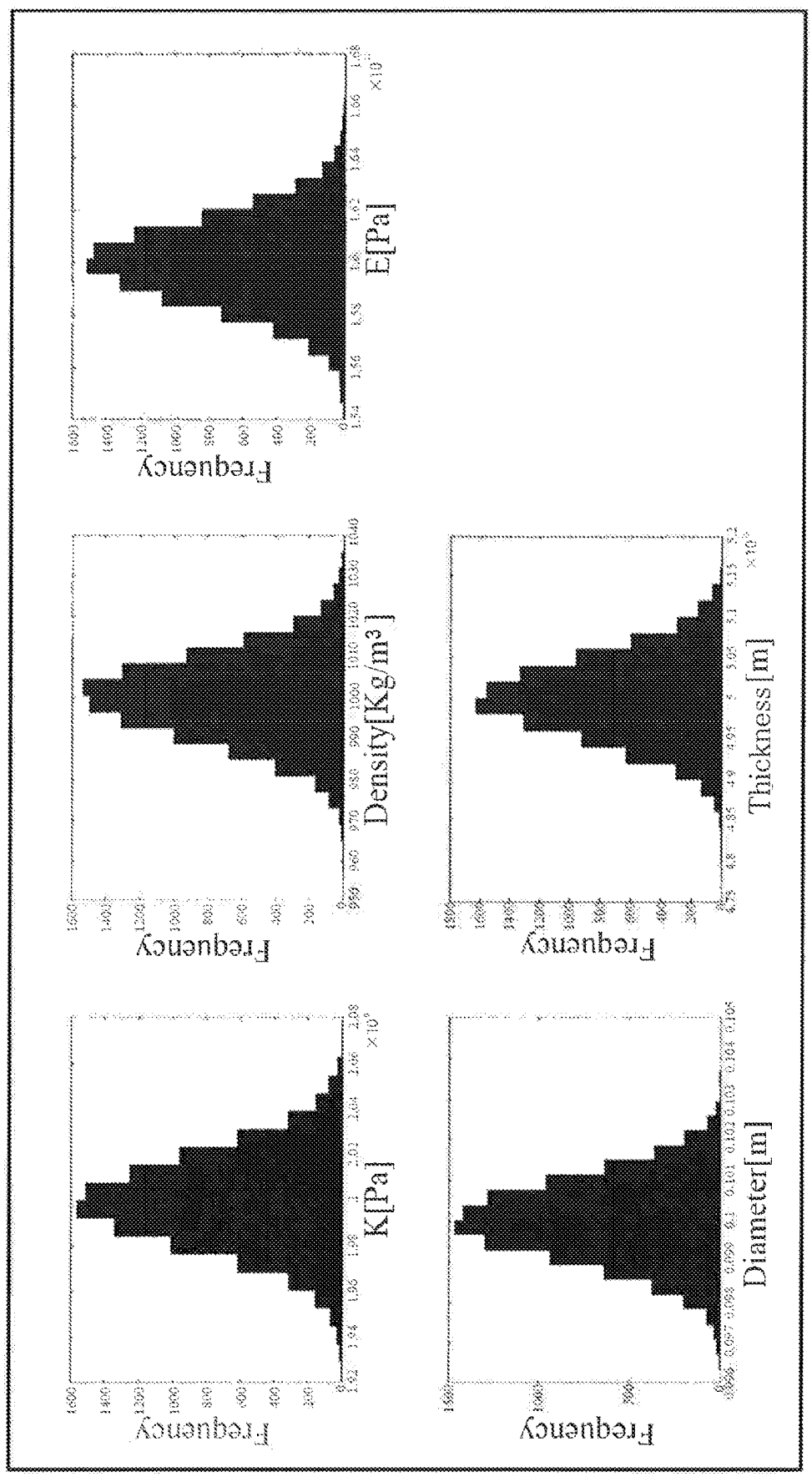
FIG. 8 is graphs illustrating input distribution data generated by applying a Monte Carlo method to construction information, design information, and material information in an example.

A numerical experiment was conducted in accordance with the piping diagnostic method illustrated in FIGS. 2 and 5 by use of the piping diagnostic device 1 illustrated in FIG. 4. First, data on a mean value of bulk modulus (bulk modulus of elasticity) of water, a mean value of density of water, a mean value of elastic moduli of water pipes, a mean value of diameters of the water pipes, a mean value of wall thicknesses of the water pipes, and a mean value of standard deviations thereof, based on construction specifications stored in the construction DB 11a, design specifications, design drawings, and designed values stored in the design DB 11b, and material test data stored in the material DB 11c, were read by the criteria distribution generating unit 12 (S11). Here, the mean value K of bulk modulus (bulk modulus of elasticity) of water was set as K=2×10³ Mega Pascal (MPa), the mean value $\rho_w$ of density of water was set as $\rho_w$=1000 kilogram/meter³ (kg/m³), the mean value E of elastic moduli of the water pipes was set as E=160 Giga Pascal (GPa), the mean value d of diameters of the water pipes was set as d=100 millimeter (mm), and the mean value t of wall thicknesses of the water pipes was set as t=5 mm, and the standard deviations each were set as approximately 1% of the mean values. A simulation using these data were performed by use of the criteria distribution generating unit 12 according to a Monte Carlo method using a sequence of pseudo-random numbers. Results of the simulation are illustrated in FIG. 8. The pseudo-random numbers was assumed to conform to a normal distribution. In the criteria distribution generating unit 12, a criteria distribution, which is statistical data of criteria data on sound velocity of vibration of the water pipes, was further generated by use of a sound velocity model of vibration of water pipes represented by the expression (1) using the data illustrated in FIG. 8 as input data (S12), and was stored in the criteria DB 13 (S13).

[Math. 1]

$$v = \frac{\sqrt{\frac{K}{\rho_w}}}{\sqrt{1 + \frac{Kd}{Et}}} \quad (1)$$

Figure 9:
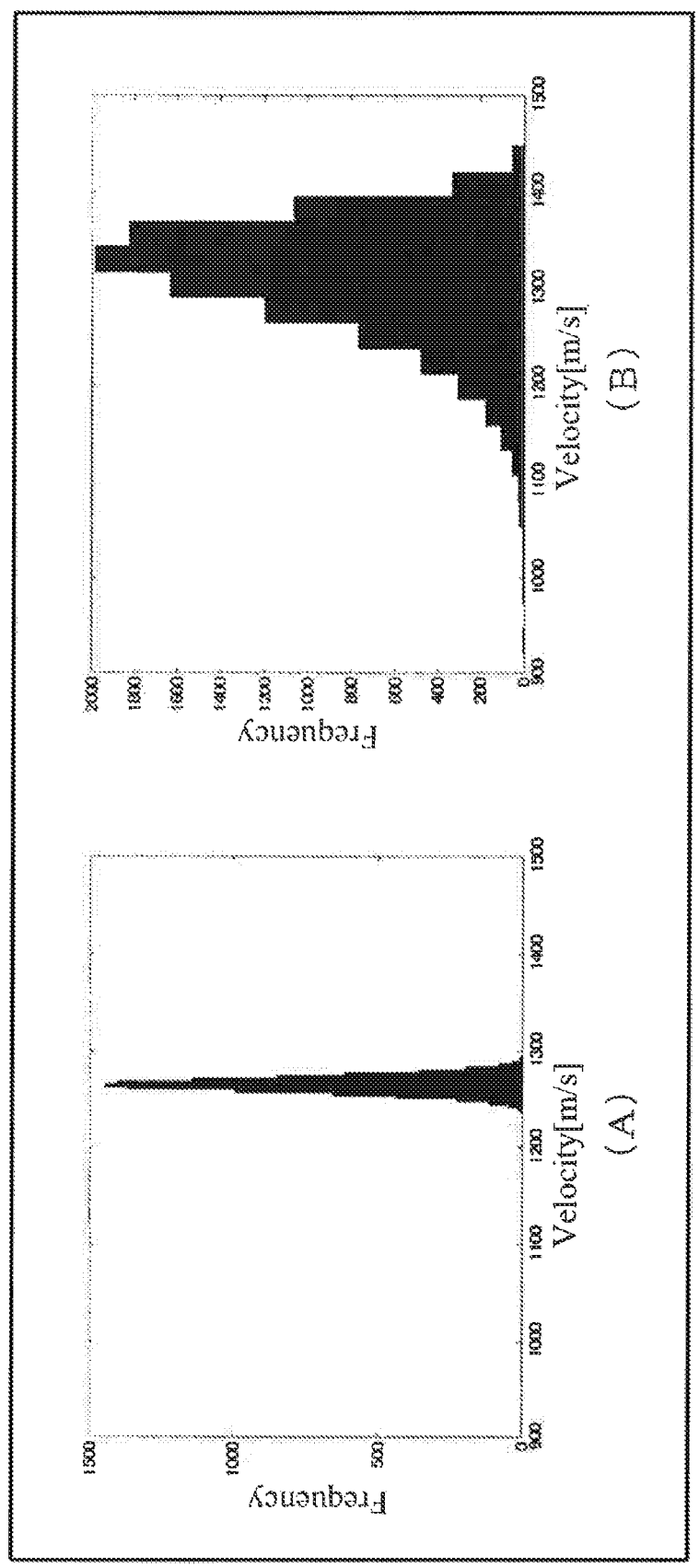
FIG. 9 is graphs illustrating a criteria distribution and a changed-state distribution generated in the example.

The criteria distribution is illustrated in (A) of FIG. 9. As illustrated in the drawing, the criteria distribution resulted in a distribution close to a normal distribution in a shape. However, it should be noted that, with regard to generally-used water pipes, the same result does not always hold.

Next, in a field experiment, vibration of the water pipes that have changed due to aging was measured by the measurement unit 21 (S21). The water pipes that have changed due to aging and that were used in the field experiment was a plurality of water pipes that have been used for a predetermined period or longer since the start of use. In the following description, a result of the field experiment that was performed 20 times for each of 20 water pipes that had changed due to aging is described. The number of water pipes that have changed due to aging and that are used in the field experiment and the number of performances of the field experiment are not limited to the above example. As to water pipes that have changed due to aging, the wall thickness of a water pipe sometimes decreases due to, for example, corrosion. As to water pipes that have changed due to aging, the inner diameter of a water pipe also sometimes decreases due to, for example, deposition of at least any of rust, scale, slime, and the like to the inner wall of the water pipe. When the wall thickness of a water pipe decreases, the sound velocity of vibration of the water pipe decelerates. When the inner diameter (that is, the above-described diameter) of a water pipe decreases, the sound velocity of vibration of the water pipe accelerates. Since the measurement resulted that the sound velocity of vibration of the water pipes that have changed due to aging conformed to a Weibull distribution, in the example, a pseudo-sample was made according to a Monte Carlo method by use of estimated parameters of the Weibull distribution by the indexing unit 22 (S22), and the pseudo-sample was stored as a changed-state distribution, which is statistical data of changed-state data, in the changed-state DB 23 (S23). The changed-state distribution is illustrated in FIG. 9B.

Figure 10:
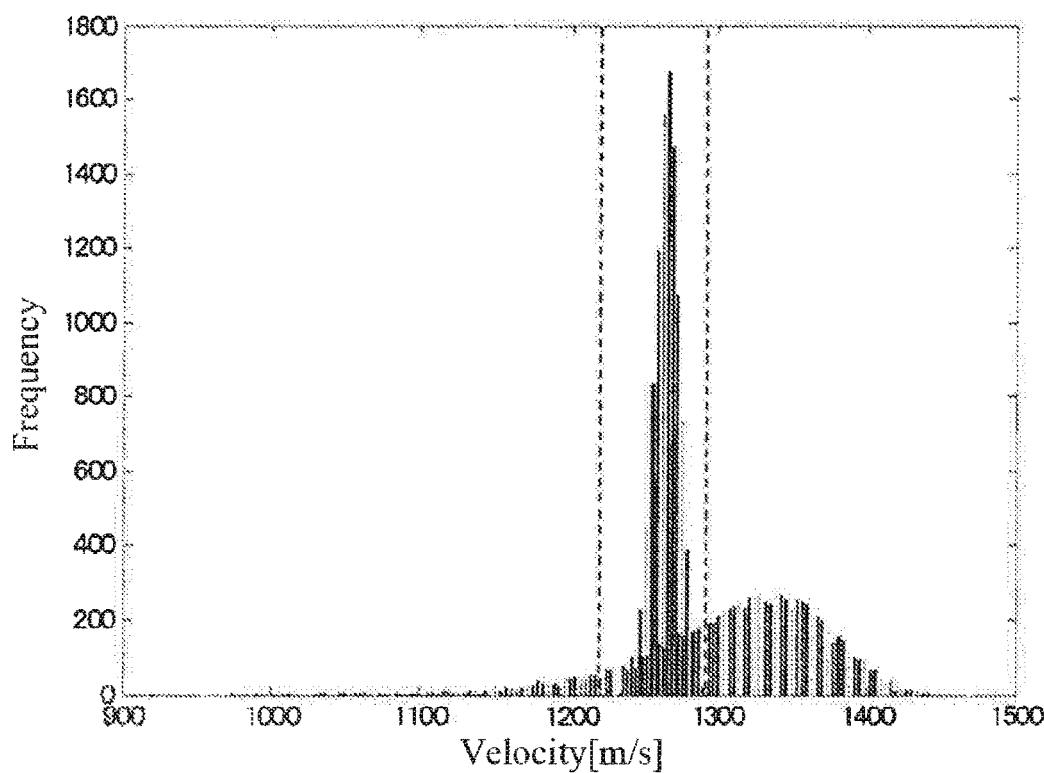
FIG. 10 is a graph illustrating a discriminant criterion generated in the example.

Next, a discriminant function, which is a discriminant criterion, was generated on the basis of the criteria distribution and the changed-state distribution by using a support vector machine for the discriminant problem optimizing unit 41. In the above-described generation of a discriminant function by a support vector machine, a least square support vector machine was used, and a linear kernel was used for a kernel function. The discriminant function is illustrated in FIG. 10. In FIG. 10, discriminant boundaries determined by the discriminant function are illustrated by dotted lines. As illustrated in the drawing, it can be seen that discriminant boundaries between the criteria distribution and the changed-state distribution are generated. In FIG. 10, changed-state data that have sound velocities slower in comparison with the discriminant boundary on the side where the sound velocity of vibration of the water pipes is slower and changed-state data that have sound velocities faster in comparison with the discriminant boundary on the side where the sound velocity of vibration of the water pipes is faster may be considered to indicate deterioration of the water pipes. The above experiment confirmed that, even for existing water pipes for which data in normal conditions are not possible to acquire in advance, deterioration can be determined by using the criteria distribution and the changed-state distribution as training data.

Figure 11:
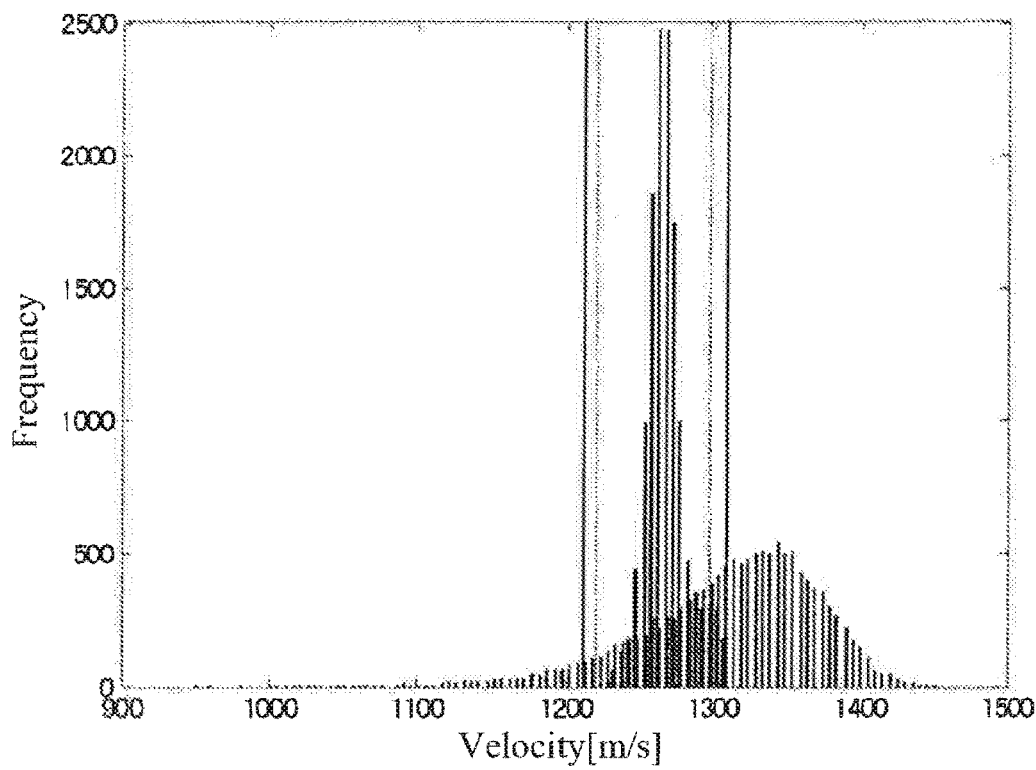
FIG. 11 is a graph illustrating a change in the discriminant criterion when the criteria distribution is updated based on a result of determination on deterioration of water pipes in the example.

Next, the labeling unit 34 updated the criteria distribution stored in the criteria DB 13, based on a determination result of deterioration of the water pipes (S34), and the discriminant problem optimizing unit 41 generates a discriminant function that is a discriminant criterion on the basis of the updated criteria distribution and the changed-state distribution, and thereby updated the discriminant function (S35). The updated discriminant function is illustrated in FIG. 11. In FIG. 11, the dotted lines indicate discriminant boundaries in a case where the update was not performed, and the solid lines indicate discriminant boundaries in a case where the update was performed. As illustrated in the drawing, although the estimated width of the criteria distribution was too narrow when the update was not performed, the update caused the width of the criteria distribution to be expanded and discriminant boundaries to be determined more appropriately.

OTHER EXAMPLE EMBODIMENTS

Each of the devices according to the respective example embodiments of the present invention may be achieved by a computer that includes a memory and a processor executing a program stored in the memory. Each of the devices according to their respective example embodiments of the present invention may also be achieved by dedicated hardware, such as a circuit. Each of the devices according to their respective example embodiments of the present invention may also be achieved by a combination of the above-described computer and dedicated hardware. Each of the devices according to their respective example embodiments of the present invention may be achieved by one device. Each of the devices according to their respective example embodiments of the present invention may be achieved by a plurality of devices that are interconnected in a communicable manner.

FIG. 15 is a block diagram schematically illustrating a configuration of a computer 1000 that is capable of achieving each of the devices according to the respective example embodiments of the present invention.

As illustrated in FIG. 15, the computer 1000 includes a processor 1001, a memory 1002, a storage device 1003, and an input/output (I/O) interface 1004. In addition, the computer 1000 is capable of accessing a storage medium 1005. The memory 1002 and the storage device 1003 are, for example, storage devices such as a random access memory (RAM) or a hard disk. The storage medium 1005 is, for example, a storage device such as a RAM or a hard disk, a read only memory (ROM), or a portable storage medium. The storage device 1003 may be the storage medium 1005. The processor 1001 is capable of reading and writing data and programs to and from the memory 1002 and the storage device 1003. The processor 1001 is capable of accessing, for example, another device via the I/O interface 1004. The processor 1001 is capable of accessing the storage medium 1005. In the storage medium 1005, a program that makes the computer 1000 operate as the piping diagnostic device 1 may be stored. In the storage medium 1005, a program that makes the computer 1000 operate as the piping diagnostic device 1 may be stored. In the storage medium 1005, a program that makes the computer 1000 operate as the discriminant-problem optimizing device 2 may be stored. In the storage medium 1005, a program that makes the computer 1000 operate as the criteria distribution generating device 3 may be stored.

The processor 1001 loads a program stored in the storage medium 1005 into the memory 1002. The processor 1001 executes a program loaded into the memory 1002. The computer 1000 operates as the piping diagnostic device 1, the discriminant-problem optimizing device 2, or the criteria distribution generating device 3.

Hereinafter, a group including the criteria distribution generating unit 12, the measurement unit 21, the indexing unit 22, the measurement unit 31, the indexing unit 32, the determining unit 33, the labeling unit 34, the abnormal index determining unit 36, and the discriminant problem optimizing unit 41 is referred to as a first group. A group including the construction DB 11a, the design DB 11b, the material DB 11c, the criteria DB 13, and the changed-state DB 23 is referred to as a second group. The units each included in the first group may be achieved by the above-described memory 1002 and processor 1001. The DBs each included in the second group may be achieved by the memory 1002 and the storage device 1003, such as a hard disk device, that the computer 1000 includes. In other words, the construction DB 11*a*, the design DB 11*b*, the material DB 11*c*, the criteria DB 13, and the changed-state DB 23 refer to their respective storage devices each stores the databases. Part or all of the units included in the first group and the second group may also be achieved by means of dedicated hardware (for example, dedicated circuits).

The present invention has been described above by use of example embodiments and an example thereof, but the present invention is not limited to the above example embodiments and example. Various modifications that could be understood by a person skilled in the art may be applied to the configurations and details of the present invention within the scope of the present invention.

All or part of the example embodiments and the example described above may be described as in the following Supplementary Notes, but the present invention is not limited thereto.

(Supplementary Note 1)

A piping diagnostic device including:

criteria distribution generating means for generating a criteria distribution that is statistical data of criteria data of piping based on construction information about the piping, design information about the piping, and material information about the piping;

changed-state distribution generating means for generating a changed-state distribution that is statistical data of changed-state data of the piping that have changed due to aging based on at least either vibration or dynamic pressure of the piping that have changed due to aging;

measurement means for measuring at least either vibration or dynamic pressure of the piping; and determining means for determining deterioration of the piping based on the criteria distribution, the changed-state distribution, and at least either vibration or dynamic pressure of the piping.

(Supplementary Note 2)

The piping diagnostic device according to Supplementary Note 1, wherein the changed-state distribution generating means updates the changed-state distribution based on a result of determination on deterioration of the piping.

(Supplementary Note 3)

The piping diagnostic device according to Supplementary Note 1 or 2, wherein the criteria distribution generating means updates the criteria distribution based on a result of determination on deterioration of the piping.

(Supplementary Note 4)

The piping diagnostic device according to any one of Supplementary Notes 1 to 3, further including:

indexing means for calculating a discriminant index based on at least either vibration or dynamic pressure of the piping;

abnormal index determining means for determining whether or not the discriminant index is abnormal based on the discriminant index and a predetermined threshold value; and cause investigating means for identifying, when the discriminant index is determined to be abnormal, a cause thereof, and rewriting at least one of the construction information, the design information, and the material information, wherein the determining means determines deterioration of the piping, when the discriminant index is determined to be normal.

(Supplementary Note 5)

The piping diagnostic device according to Supplementary Note 4, wherein the discriminant index is at least either sound velocity of vibration or a natural frequency of the piping.

(Supplementary Note 6)

The piping diagnostic device according to any one of Supplementary Notes 1 to 5, wherein the measurement means is at least one selected from a group including an acceleration sensor, a displacement sensor, a velocity sensor, a water pressure meter, a hydrophone, and a dynamic pressure sensor.

(Supplementary Note 7)

The piping diagnostic device according to any one of Supplementary Notes 1 to 6, wherein the criteria distribution generating means uses at least one selected from a group including a finite element method and a theoretical expression based on elastic theory, the finite element method using a material constant, a dimensions constant, and a boundary condition as input.

(Supplementary Note 8)

The piping diagnostic device according to any one of Supplementary Notes 1 to 7, further including discriminant problem optimizing means for generating a discriminant criterion based on the criteria distribution and the changed-state distribution, wherein the determining means determines deterioration of the piping based on the discriminant criterion and at least either vibration or dynamic pressure of the piping.

(Supplementary Note 9)

The piping diagnostic device according to Supplementary Note 8, wherein the discriminant problem optimizing means is at least one selected from a group including a support vector machine, a linear classifier, a kernel classifier, a k-NN classifier, and a deep neural network.

(Supplementary Note 10)

A piping diagnostic method including:

performing criteria distribution generation including generating a criteria distribution that is statistical data of criteria data of piping based on construction information about the piping, design information about the piping, and material information about the piping;

generating a changed-state distribution that is statistical data of changed-state data of the piping that have changed due to aging based on at least either vibration or dynamic pressure of the piping that have changed due to aging;

measuring at least either vibration or dynamic pressure of the piping; and performing deterioration determination including determining deterioration of the piping based on the criteria distribution, the changed-state distribution, and at least either vibration or dynamic pressure of the piping.

(Supplementary Note 11)

The piping diagnostic method according to Supplementary Note 10, including updating the changed-state distribution based on a result of determination on deterioration of the piping.

(Supplementary Note 12)

The piping diagnostic method according to Supplementary Note 10 or 11, including updating the criteria distribution based on a result of determination on deterioration of the piping.

(Supplementary Note 13)

The piping diagnostic method according to any one of Supplementary Notes 10 to 12 further including:

calculating a discriminant index based on at least either vibration or dynamic pressure of the piping;

determining whether or not the discriminant index is abnormal based on the discriminant index and a predetermined threshold value;

identifying, when the discriminant index is determined to be abnormal, a cause thereof and rewriting at least one of the construction information, the design information, and the material information; and determining deterioration of the piping in the deterioration determination, when the discriminant index is determined to be normal.

(Supplementary Note 14)

The piping diagnostic method according to Supplementary Note 13, wherein the discriminant index is at least either sound velocity of vibration or a natural frequency of the piping.

(Supplementary Note 15)

The piping diagnostic method according to any one of Supplementary Notes 10 to 14, including using, for measurement of at least either vibration or dynamic pressure of the piping, at least one selected from a group including an acceleration sensor, a displacement sensor, a velocity sensor, a water pressure meter, a hydrophone, and a dynamic pressure sensor.

(Supplementary Note 16)

The piping diagnostic method according to any one of Supplementary Notes 10 to 15, including using, for the criteria distribution generation, at least one selected from a group including a finite element method and a theoretical expression based on elastic theory, the finite element method using a material constant, a dimensions constant, and a boundary condition as input.

(Supplementary Note 17)

The piping diagnostic method according to any one of Supplementary Notes 10 to 16, further including performing discriminant problem optimization including generating a discriminant criterion based on the criteria distribution and the changed-state distribution, wherein the deterioration determination includes determining deterioration of the piping based on the discriminant criterion and at least either vibration or dynamic pressure of the piping.

(Supplementary Note 18)

The piping diagnostic method according to Supplementary Note 17, wherein the discriminant problem optimization uses at least one selected from a group including a support vector machine, a linear classifier, a kernel classifier, a k-NN classifier, and a deep neural network.

(Supplementary Note 19)

A computer-readable storage medium storing a program making a computer execute:

criteria distribution generating processing of generating a criteria distribution that is statistical data of criteria data based on construction information about piping, design information about the piping, and material information about the piping;

changed-state distribution generating processing of generating a changed-state distribution that is statistical data of changed-state data based on at least either vibration or dynamic pressure of the piping that have changed due to aging;

measurement processing of measuring at least either vibration or dynamic pressure of the piping; and determining processing of determining deterioration of the piping based on the criteria distribution, the changed-state distribution, and at least either vibration or dynamic pressure of the piping.

(Supplementary Note 20)

The computer-readable storage medium according to Supplementary Note 19, storing the program, wherein the changed-state distribution generating processing updates the changed-state distribution based on a result of determination on deterioration of the piping.

(Supplementary Note 21)

The computer-readable storage medium according to Supplementary Note 19 or 20, storing the program, wherein the criteria distribution generating processing updates the criteria distribution based on a result of determination on deterioration of the piping.

(Supplementary Note 22)

The computer-readable storage medium according to any one of Supplementary Notes 19 to 21, storing the program further making the computer execute:

indexing processing of calculating a discriminant index based on at least either vibration or dynamic pressure of the piping;

abnormal index determining processing of determining whether or not the discriminant index is abnormal based on the discriminant index and a predetermined threshold value; and cause investigating processing of identifying, when the discriminant index is determined to be abnormal, a cause thereof, and rewriting at least one of the construction information, the design information, and the material information, wherein the determining processing determines deterioration of the piping, when the discriminant index is determined to be normal.

(Supplementary Note 23)

The computer-readable storage medium according to Supplementary Note 22, storing the program, wherein the discriminant index is at least either sound velocity of vibration or a natural frequency of the piping.

(Supplementary Note 24)

The computer-readable storage medium according to any one of Supplementary Notes 19 to 23, storing the program, wherein the measurement processing is performed using at least one selected from a group including an acceleration sensor, a displacement sensor, a velocity sensor, a water pressure meter, a hydrophone, and a dynamic pressure sensor.

(Supplementary Note 25)

The computer-readable storage medium according to any one of Supplementary Notes 19 to 24, storing the program, wherein the criteria distribution generating processing uses at least one selected from a group including a finite element method and a theoretical expression based on elastic theory, the finite element method using a material constant, a dimensions constant, and a boundary condition as input.

(Supplementary Note 26)

The computer-readable storage medium according to any one of Supplementary Notes 19 to 25, storing the program, the program further making the computer execute discriminant problem optimizing processing of generating a discriminant criterion based on the criteria distribution and the changed-state distribution, wherein the determining processing determines deterioration of the piping based on the discriminant criterion and at least either vibration or dynamic pressure of the piping.

(Supplementary Note 27)

The computer-readable storage medium according to Supplementary Note 26, storing the program, wherein the discriminant problem optimizing processing is based on at least one selected from a group including a support vector machine, a linear classifier, a kernel classifier, a k-NN classifier, and a deep neural network.

(Supplementary Note 28)

A computer-readable storage medium storing a program making a computer execute a piping diagnostic method according to any one of Supplementary Notes 19 to 27.

(Supplementary Note 29)

A discriminant-problem optimizing device including:

criteria distribution generating means for generating a criteria distribution that is statistical data of criteria data of the piping based on construction information about piping, design information about the piping, and material information about the piping;

changed-state distribution generating means for generating a changed-state distribution that is statistical data of changed-state data of the piping that have changed due to aging based on at least either vibration or dynamic pressure of the piping that have changed due to aging; and discriminant problem optimizing means for generating a discriminant criterion based on the criteria distribution and the changed-state distribution.

(Supplementary Note 30)

A discriminant-problem optimizing method including:

performing criteria distribution generation of generating a criteria distribution that is statistical data of criteria data of the piping based on construction information about piping, design information about the piping, and material information about the piping;

generating a changed-state distribution that is statistical data of changed-state data of the piping that have changed due to aging based on at least either vibration or dynamic pressure of the piping that have changed due to aging; and performing discriminant problem optimization of generating a discriminant criterion based on the criteria distribution and the changed-state distribution.

(Supplementary Note 31)

A computer-readable storage medium storing a program making a computer execute:

criteria distribution generating processing of generating a criteria distribution that is statistical data of criteria data of the piping based on construction information about piping, design information about the piping, and material information about the piping;

changed-state distribution generating processing of generating a changed-state distribution that is statistical data of changed-state data of the piping that have changed due to aging based on at least either vibration or dynamic pressure of the piping that have changed due to aging; and discriminant problem optimizing processing of generating a discriminant criterion based on the criteria distribution and the changed-state distribution.

(Supplementary Note 32)

A criteria distribution generating device including:

construction information acquiring means for acquiring construction information about piping;

design information acquiring means for acquiring design information about the piping;

material information acquiring means for acquiring material information about the piping; and criteria distribution generating means for generating a criteria distribution that is statistical data of criteria data of the piping, by use of at least one selected from a group including a finite element method and a theoretical expression based on elastic theory, based on the construction information, the design information, and the material information, the finite element method using a material constant, a dimensions constant, and a boundary condition as input.

(Supplementary Note 33)

A criteria distribution generating method including:

acquiring construction information about piping;

acquiring design information about the piping;

acquiring material information about the piping; and performing criteria distribution generation of generating a criteria distribution that is statistical data of criteria data of the piping, by use of at least one selected from a group including a finite element method and a theoretical expression based on elastic theory, based on the construction information, the design information, and the material information, the finite element method using a material constant, a dimensions constant, and a boundary condition as input.

(Supplementary Note 34)

A computer-readable storage medium storing a program making a computer execute:

construction information acquiring processing of acquiring construction information about piping;

design information acquiring processing of acquiring design information about the piping;

material information acquiring processing of acquiring material information about the piping; and criteria distribution generating processing of generating a criteria distribution that is statistical data of criteria data of the piping, by use of at least one selected from a group including a finite element method and a theoretical expression based on elastic theory, based on the construction information, the design information, and the material information, the finite element method using a material constant, a dimensions constant, and a boundary condition as input.

(Supplementary Note 35)

A piping diagnostic device including:

criteria distribution generating means for generating a criteria distribution that is statistical data of criteria data of piping based on construction information about the piping and design information about the piping;

changed-state distribution generating means for generating a changed-state distribution that is statistical data of changed-state data of the piping that have changed due to aging based on at least either vibration or dynamic pressure of the piping that have changed due to aging;

measurement means for measuring at least either vibration or dynamic pressure of the piping; and determining means for determining deterioration of the piping based on the criteria distribution, the changed-state distribution, and at least either vibration or dynamic pressure of the piping.

(Supplementary Note 36)

A piping diagnostic method including:

performing criteria distribution generation of generating a criteria distribution that is statistical data of criteria data of piping based on construction information about the piping and design information about the piping;

performing changed-state distribution generation of generating a changed-state distribution that is statistical data of changed-state data of the piping that have changed due to aging based on at least either vibration or dynamic pressure of the piping that have changed due to aging;

measuring at least either vibration or dynamic pressure of the piping; and performing deterioration determination of determining deterioration of the piping based on the criteria distribution, the changed-state distribution, and at least either vibration or dynamic pressure of the piping.

(Supplementary Note 37)

A computer-readable storage medium storing a program making a computer execute:

criteria distribution generating processing of generating a criteria distribution that is statistical data of criteria data of piping based on construction information about the piping and design information about the piping;

changed-state distribution generating processing of generating a changed-state distribution that is statistical data of changed-state data of the piping that have changed due to aging based on at least either vibration or dynamic pressure of the piping that have changed due to aging;

measurement processing of measuring at least either vibration or dynamic pressure of the piping; and determining processing of determining deterioration of the piping based on the criteria distribution, the changed-state distribution, and at least either vibration or dynamic pressure of the piping.

This application claims priority based on Japanese Patent Application No. 2016-035123, filed on Feb. 26, 2016, the entire disclosure of which is incorporated herein by criteria.

INDUSTRIAL APPLICABILITY

The present invention enables a piping diagnostic device and a piping diagnostic method to be provided that are applicable to even piping for which data in normal conditions are difficult to acquire in advance. The piping diagnostic device and the piping diagnostic method of the present invention may be widely used for diagnostic of various types of piping including piping constituting a piping network that transports water, oil, gas, and the like.

CRITERIA SIGNS LIST

1 Piping diagnostic device
2 Discriminant-problem optimizing device
3 Criteria distribution generating device
10 Criteria DB unit
11a Construction DB
11b Design DB
11c Material DB
12 Criteria distribution generating unit
13 Criteria DB
20 Changed-state DB unit
21, 31 Measurement unit
22, 32 Indexing unit
23 Changed-state DB
30 Diagnostic unit
33 Determining unit
34 Labeling unit
36 Abnormal index determining unit
37 Cause investigating unit
40 Learning unit
41 Discriminant problem optimizing unit
1000 Computer
1001 Processor
1002 Memory
1003 Storage device
1004 I/O interface
1005 Storage medium

What is claimed is:

1. A piping diagnostic device comprising:

a memory that stores a set of instructions; and at least one processor configured to execute the set of instructions to:

obtain, from one or more databases, construction information about piping, design information about the piping, and material information about the piping;

generate a criteria distribution that is statistical data of criteria data of piping based on the construction information about the piping, the design information about the piping, and the material information about the piping;

generate a changed-state distribution that is statistical data of changed-state data of the piping that have changed due to aging based on at least either vibration or dynamic pressure of the piping that have changed due to aging;

measure, by at least one of an acceleration sensor, a displacement sensor, a velocity sensor, a water pressure meter, a hydrophone, and a dynamic pressure sensor, at least either vibration or dynamic pressure of the piping;

determine deterioration of the piping based on a learned model, and at least either the measured vibration or the measured dynamic pressure of the piping;

update at least either the criteria distribution or the changed-state distribution based on a result of the determination on the deterioration of the piping;

newly measure at least either vibration or dynamic pressure of the piping; and newly determine deterioration of the piping based on the learned model, and at least either the newly measured vibration or the newly measured dynamic pressure of the piping; wherein, the learned model is machine-learned based on the criteria distribution or the changed-state distribution.

2. The piping diagnostic device according to claim 1, wherein the at least one processor is further configured to:

calculate a discriminant index based on at least either the vibration or the dynamic pressure of the piping;

determine whether or not the discriminant index is abnormal based on the discriminant index and a predetermined threshold value; and identify, when the discriminant index is determined to be abnormal, a cause thereof, and rewriting at least one of the construction information, the design information, and the material information; and determine deterioration of the piping, when the discriminant index is determined to be normal.

3. The piping diagnostic device according to claim 2, wherein the discriminant index is at least either sound velocity of the vibration or a natural frequency of the piping.

4. The piping diagnostic device according to claim 1, wherein the at least one processor is further configured to use at least one selected from a group including a finite element method and a theoretical expression based on elastic theory, the finite element method using a material constant, a dimensions constant, and a boundary condition as input.

5. The piping diagnostic device according to claim 1, further comprising
the at least one processor is further configured to:
generate a discriminant criterion as the learned model based on the criteria distribution and the changed-state distribution; and
determine deterioration of the piping based on the discriminant criterion and at least either the vibration or the dynamic pressure of the piping.

6. The piping diagnostic device according to claim 5, wherein
the at least one processor is further configured to
generate the discriminant criterion by at least one selected from a group including a support vector machine, a linear classifier, a kernel classifier, a k-NN classifier, and a deep neural network.

7. A piping diagnostic method comprising:
obtaining, from one or more databases, construction information about piping, design information about the piping, and material information about the piping;
performing criteria distribution generation including generating a criteria distribution that is statistical data of criteria data of the piping based on the construction information about the piping, the design information about the piping, and the material information about the piping;
generating a changed-state distribution that is statistical data of changed-state data of the piping that have changed due to aging based on at least either vibration or dynamic pressure of the piping that have changed due to aging;
measuring, by at least one of an acceleration sensor, a displacement sensor, a velocity sensor, a water pressure meter, a hydrophone, and a dynamic pressure sensor, at least either vibration or dynamic pressure of the piping;
performing deterioration determination including determining deterioration of the piping based on a learned model, and at least either the measured vibration or the measured dynamic pressure of the piping;
updating at least either the criteria distribution or the changed-state distribution based on a result of the determination on the deterioration of the piping;
newly measuring at least either vibration or dynamic pressure of the piping; and
newly determining deterioration of the piping based on the learned model, and at least either the newly measured vibration or the newly measured dynamic pressure of the piping; wherein,
the learned model is machine-learned based on the criteria distribution or the changed-state distribution.

8. The piping diagnostic method according to claim 7 further comprising:
calculating a discriminant index based on at least either the vibration or the dynamic pressure of the piping;
determining whether or not the discriminant index is abnormal based on the discriminant index and a predetermined threshold value;
identifying, when the discriminant index is determined to be abnormal, a cause thereof and rewriting at least one of the construction information, the design information, and the material information; and
determining deterioration of the piping in the deterioration determination, when the discriminant index is determined to be normal.

9. The piping diagnostic method according to claim 8, wherein
the discriminant index is at least either sound velocity of the vibration or a natural frequency of the piping.

10. The piping diagnostic method according to claim 7, comprising
using, for the criteria distribution generation, at least one selected from a group including a finite element method and a theoretical expression based on elastic theory, the finite element method using a material constant, a dimensions constant, and a boundary condition as input.

11. The piping diagnostic method according to claim 7, further comprising
performing discriminant problem optimization including generating a discriminant criterion as the learned model based on the criteria distribution and the changed-state distribution, wherein
the deterioration determination includes determining deterioration of the piping based on the discriminant criterion and at least either the vibration or the dynamic pressure of the piping.

12. The piping diagnostic method according to claim 11, wherein
the discriminant problem optimization uses at least one selected from a group including a support vector machine, a linear classifier, a kernel classifier, a k-NN classifier, and a deep neural network.

13. A non-transitory computer-readable storage medium storing a program making a computer execute:
obtainment processing of obtaining, from one or more databases, construction information about piping, design information about the piping, and material information about the piping;
criteria distribution generating processing of generating a criteria distribution that is statistical data of criteria data based on the construction information about the piping, the design information about the piping, and the material information about the piping;
changed-state distribution generating processing of generating a changed-state distribution that is statistical data of changed-state data based on at least either vibration or dynamic pressure of the piping that have changed due to aging;
measurement processing of measuring, by at least one of an acceleration sensor, a displacement sensor, a velocity sensor, a water pressure meter, a hydrophone, and a dynamic pressure sensor, at least either vibration or dynamic pressure of the piping;
determining processing of determining deterioration of the piping based on a learned model, and at least either the measured vibration or the measured dynamic pressure of the piping;
updating processing of updating at least either the criteria distribution or the changed-state distribution based on a result of the determination on the deterioration of the piping;
newly measuring processing of newly measuring at least either vibration or dynamic pressure; and newly determining processing of newly determining deterioration of the piping based on the learned model, and at least either the newly measured vibration or the newly measured dynamic pressure of the piping; wherein, the learned model is machine-learned based on the criteria distribution or the changed-state distribution.

\* \* \* \* \*